(12) United States Patent
Bu et al.

(10) Patent No.: US 9,798,824 B2
(45) Date of Patent: Oct. 24, 2017

(54) METHODS AND TERMINALS FOR GENERATING AND READING 2D BARCODE AND SERVERS

(71) Applicant: TENCENT TECHNOLOGY (SHENZHEN) COMPANY LIMITED, Shenzhen, Guangdong (CN)

(72) Inventors: Manzhao Bu, Shenzhen (CN); Wenning Tang, Shenzhen (CN); Ping Huang, Shenzhen (CN); Haisong Yang, Shenzhen (CN)

(73) Assignee: Tencent Technology (Shenzhen) Company Limited, Shenzhen, Guangdong (CN)

( * ) Notice: Subject to any disclaimer, the term of this patent is extended or adjusted under 35 U.S.C. 154(b) by 0 days.

(21) Appl. No.: 15/193,655

(22) Filed: Jun. 27, 2016

(65) Prior Publication Data
US 2016/0306892 A1    Oct. 20, 2016

Related U.S. Application Data

(63) Continuation of application No. PCT/CN2015/076861, filed on Apr. 17, 2015.

(30) Foreign Application Priority Data

Apr. 17, 2014 (CN) .......................... 2014 1 0154998

(51) Int. Cl.
*G06K 7/10* (2006.01)
*G06F 17/30* (2006.01)
(Continued)

(52) U.S. Cl.
CPC ..... *G06F 17/30879* (2013.01); *G06K 7/1417* (2013.01); *G06K 19/06037* (2013.01); *H04L 9/0643* (2013.01); *H04L 63/10* (2013.01)

(58) Field of Classification Search
CPC ............ G06F 17/30879; G06K 7/1417; G06K 19/06037; H04L 9/0643; H04L 63/10
(Continued)

(56) References Cited

U.S. PATENT DOCUMENTS 8,356,033 B2    1/2013 Saitou
2002/0131071 A1    9/2002 Parry
(Continued)

FOREIGN PATENT DOCUMENTS

CN    102833353 A    12/2012
CN    102855323 A    1/2013
(Continued)

OTHER PUBLICATIONS

Chinese Office Action for Application No. 2014101549980 dated Aug. 10, 2015, and an English concise explanation of relevance thereof.
(Continued)

*Primary Examiner* — Karl D Frech
(74) *Attorney, Agent, or Firm* — Harness, Dickey & Pierce, P.L.C.

(57) ABSTRACT

Generating a 2D barcode includes acquiring private information input by a user and sending the private information to a server through a network. The method includes receiving an information access address returned through the network by the server, and generating a 2D barcode including the information access address. The method further includes acquiring a 2D barcode including an information access address and scanning the 2D barcode to obtain the information access address included in the 2D barcode, the information access address being for accessing private information. The method further includes sending the information access address to a server through a network, and receiving the private information returned through the net-
(Continued)

work by the server, and using the private information as a reading result of the 2D barcode.

16 Claims, 14 Drawing Sheets

(51) Int. Cl.
  *H04L 29/06* (2006.01)
  *G06K 7/14* (2006.01)
  *G06K 19/06* (2006.01)
  *H04L 9/06* (2006.01)

(58) Field of Classification Search
  USPC ............ 235/462.1, 462.09, 462.15, 383, 494
  See application file for complete search history.

(56) References Cited

U.S. PATENT DOCUMENTS

| | | | | |
|---|---|---|---|---|
| 2004/0123292 | A1* | 6/2004 | Waldman | G06Q 10/00 |
| | | | | 718/101 |
| 2005/0040230 | A1* | 2/2005 | Swartz | G06K 17/00 |
| | | | | 235/383 |
| 2014/0103108 | A1 | 4/2014 | Sun et al. | |
| 2016/0306892 | A1 | 10/2016 | Bu et al. | |

FOREIGN PATENT DOCUMENTS

| | | |
|---|---|---|
| CN | 103049726 A | 4/2013 |
| CN | 103065116 A | 4/2013 |
| CN | 103078868 A | 5/2013 |
| CN | 103294834 A | 9/2013 |
| CN | 103400173 A | 11/2013 |
| CN | 104376353 A | 2/2015 |
| WO | 2014044183 A1 | 3/2014 |

OTHER PUBLICATIONS

International Search Report for App. No. PCT/CN2015/076861, dated Jun. 29, 2015.

International Preliminary Report for App. No. PCT/CN2015/076861, dated Oct. 18, 2016.

European Search Report for Application No. 15780070.7 dated Mar. 7, 2017.

* cited by examiner

METHODS AND TERMINALS FOR GENERATING AND READING 2D BARCODE AND SERVERS

CROSS-REFERENCE TO RELATED APPLICATIONS

This application is a continuation of International Application No. PCT/CN2015/076861, filed on Apr. 17, 2015. This application claims the benefit and priority of Chinese Application No. 201410154998.0, filed on Apr. 17, 2014. The entire disclosures of each of the above applications are incorporated herein by reference.

FIELD

The present disclosure relates to information processing technologies and to generating and reading 2D barcode and servers.

BACKGROUND

This section provides background information related to the present disclosure which is not necessarily prior art.

With the ongoing development of information processing technologies, a 2D barcode has found wide application for its characteristics, such as wide encoding range and high fault tolerance. A Quick Response (QR) 2D barcode is one type of 2D barcode, and each QR2D barcode is represented in the form of an image, where the image is an array of squares. The generation of a 2D barcode refers to the conversion of information into an image, and the reading of a 2D barcode refers to the conversion of an image into information. As the application scope of a 2D barcode is broadened, the types and quantity of information recorded in a 2D barcode keep growing, especially information involving the privacy of a user. Further, after 2D barcode software installed on a terminal scans the 2D barcode, information recorded in the 2D barcode may be directly obtained. When information recorded in a 2D barcode is private information, security of the private information cannot be protected. Therefore, how to generate and read a 2D barcode for private information becomes an issue that draws people's attention.

SUMMARY

This section provides a general summary of the disclosure, and is not a comprehensive disclosure of its full scope or all of its features.

To solve existing technical challenges, various embodiments of the present disclosure provide methods and terminals for generating and reading 2D barcode and servers.

According to various embodiments, a method for generating a 2D barcode is provided, the method includes:

acquiring private information input by a user and sending the private information to a server through a network so that the server stores the private information and generates an information access address corresponding to the private information;

receiving the information access address returned through the network by the server; and generating a 2D barcode including the information access address.

According to various embodiments, a method for generating a 2D barcode is provided, the method includes receiving private information sent, through a network, by a terminal, and storing the private information;

generating an information access address corresponding to the private information; and returning the information access address to the terminal through the network, so that the terminal generates a 2D barcode according to the information access address.

According to various embodiments, a method for reading a 2D barcode is provided, the method includes:

acquiring a 2D barcode including an information access address and scanning the 2D barcode to obtain the information access address included in the 2D barcode, the information access address meant for accessing private information;

sending the information access address to a server through a network so that the server searches for corresponding private information according to the information access address; and receiving the private information returned through the network by the server and using the private information as a reading result of the 2D barcode.

According to various embodiments, a method for reading a 2D barcode is provided, the method includes:

receiving an information access address sent, through a network, by a terminal and for accessing private information;

searching prestored private information for private information corresponding to the information access address; and returning the found private information to the terminal through the network so that the terminal uses the private information as a reading result of a 2D barcode.

According to various embodiments, a terminal for generating a 2D barcode is provided, the terminal includes:

an acquisition module configured to acquire private information input by a user;

a sending module configured to send the private information to a server through a network so that the server stores the private information, and generates an information access address corresponding to the private information;

a receiving module configured to receive the information access address returned through the network by the server; and a generation module configured to generate a 2D barcode including the information access address.

According to various embodiments, a server is provided, the server includes:

a receiving module configured to receive private information sent, through a network, by a terminal;

a storage module configured to store the private information;

a generation module configured to generate an information access address corresponding to the private information; and a return module configured to return the information access address to the terminal through the network so that the terminal generates a 2D barcode according to the information access address.

According to various embodiments, a terminal for reading a 2D barcode is provided, the terminal includes:

an acquisition module configured to acquire a 2D barcode including an information access address;

a scanning module configured to scan the 2D barcode, to obtain the information access address included in the 2D barcode, the information access address being for accessing private information;

a sending module configured to send the information access address to a server through a network so that the server searches for corresponding private information according to the information access address;

a receiving module configured to receive the private information returned through the network by the server; and a reading module configured to use the private information as a reading result of the 2D barcode.

According to various embodiments, a server is provided, the server includes:

a receiving module configured to receive an information access address sent, through a network, by a terminal and for accessing private information;

a search module configured to search prestored private information for private information corresponding to the information access address; and a return module configured to return the found private information to the terminal through the network so that the terminal uses the private information as a reading result of a 2D barcode.

The beneficial effects brought by the technical methods provided in the various embodiments of the present disclosure follow.

Private information input by a user is sent to a server through a network, an information access address returned by the server through the network is received, and a 2D barcode including the information access address is generated. A 2D barcode including an information access address is acquired and scanned to obtain the information access address included in the 2D barcode, the information access address is sent to a server through a network, and private information returned by the server through the network is then received. Therefore, generation and reading of a 2D barcode are implemented without encrypting and decrypting, costs of generating and reading a 2D barcode are reduced, an application scope of a 2D barcode is broadened, and a generated and read 2D barcode includes an information access address, so that security of private information is ensured.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

To describe the technical methods in the embodiments of the present disclosure more clearly, drawings necessary in the description of the embodiments will be introduced below. One of ordinary skill in the art will recognize that the drawings in the following description are only some of the various embodiments of the present disclosure, and a person of ordinary skill in the art may obtain other drawings based on the drawings without creative efforts.

Corresponding reference numerals indicate corresponding parts throughout the several views of the drawings.

DETAILED DESCRIPTION

Example embodiments will now be described more fully with reference to the accompanying drawings.

To make the goals, technical methods, and benefits in the present disclosure clearer, the implementation manners of the present disclosure are further described in detail below with reference to the accompanying drawings.

In various scenarios, there are two manners of generating and reading a 2D barcode. A first manner of generating a 2D barcode includes acquiring private information, encrypting the private information, and generating a 2D barcode according to the encrypted private information. A first manner of reading a 2D barcode includes acquiring a 2D barcode, scanning the 2D barcode to obtain encrypted private information, and decrypting the encrypted private information by using a decrypting manner corresponding to an encrypting manner to obtain the private information and using the private information as a reading result of the 2D barcode.

A second manner of generating a 2D barcode includes acquiring private information and a private information indicator, the private information indicator being for distinguishing private information from non-private information and indicating whether to present the private information and generating a 2D barcode according to the private information and the private information indicator. A second manner of reading a 2D barcode includes scanning a 2D barcode to obtain private information and a private information indicator, so that if the private information indicator indicates to present the private information, the private information is used as a reading result of the 2D barcode, and if the private information indicator indicates not to present the private information, the reading result of the 2D barcode is empty, that is, the private information cannot be read.

In the first manner of generating a 2D barcode, private information is encrypted so that information recorded in a generated 2D barcode includes the encrypted private information; however, the encrypted private information is at a risk of being hacked, resulting in that the security of private information cannot be ensured and the cost of generating a 2D barcode is increased for the encryption of private information. In the first manner of reading a 2D barcode, a decrypting manner corresponding to an encrypting manner needs to be used so that the cost of reading a 2D barcode is increased and application of a 2D barcode is adversely affected. In the second manner of generating a 2D barcode, a generated 2D barcode includes private information and the security of private information cannot be ensured. In the second manner of reading a 2D barcode, although presentation of private information may be indicated by using a private information indicator, the security of private information still cannot be ensured.

Figure 1:
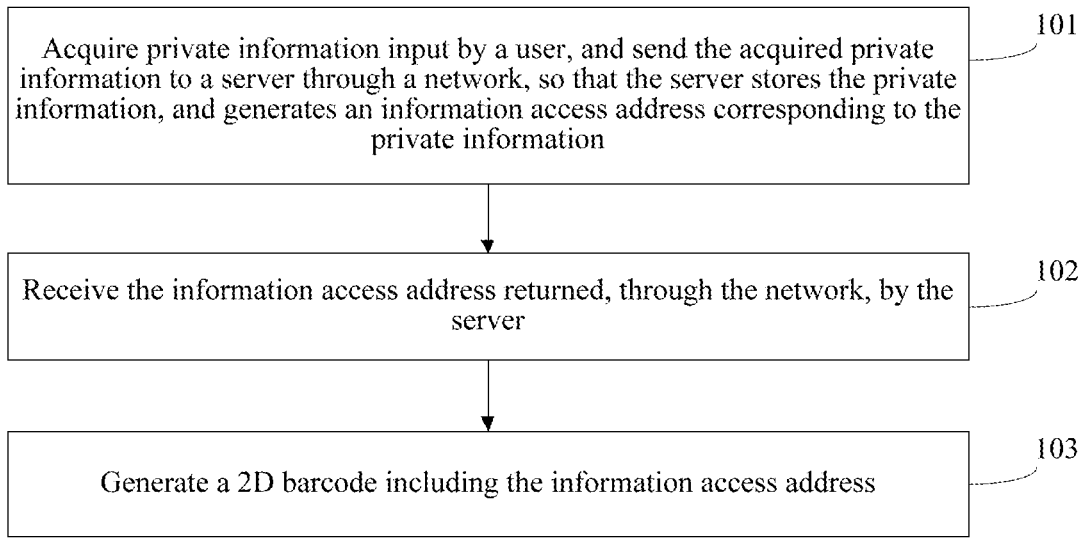
FIG. 1 is a flowchart of a first method for generating a 2D barcode according to various embodiments of the present disclosure.

For private information, various embodiments of the present disclosure provide a method for generating a 2D barcode. The method is applicable to a system for generating a 2D barcode. The system includes a terminal and a server, and the terminal and the server are both in a network environment. By using an example of a perspective that the terminal executes the method provided in the various embodiments of the present disclosure, referring to FIG. 1, a procedure of the method includes the following blocks.

Block 101: Acquire private information input by a user and send the acquired private information to a server through a network, so that the server stores the private information and generates an information access address corresponding to the private information.

Block 102: Receive the information access address returned through the network by the server. In various embodiments, the receiving the information access address returned through the network by the server includes receiving the information access address that is returned by the server through the network and at least includes an information identifier of the private information. In various embodiments, the receiving the information access address returned through the network by the server includes receiving the information access address that is returned by the server through the network and at least includes an information identifier of the private information and a check identifier and/or a time identifier corresponding to the private information.

Block 103: Generate a 2D barcode including the information access address.

Figure 2:
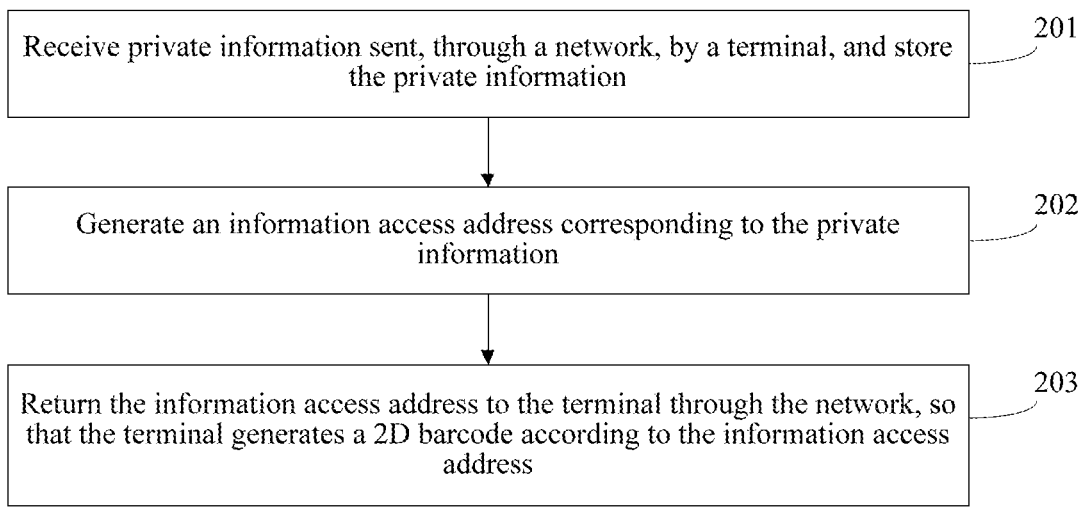
FIG. 2 is a flowchart of a second method for generating a 2D barcode according to various embodiments of the present disclosure.

Referring to FIG. 2, by using an example of a perspective that a server executes a method for generating a 2D barcode provided in the various embodiments of the present disclosure, a procedure of the method provided in the various embodiments of the present disclosure includes the following blocks.

Block 201: Receive private information sent, through a network, by a terminal, and store the private information.

Block 202: Generate an information access address corresponding to the private information. In various embodiments, the generating an information access address corresponding to the private information includes:

acquiring an information identifier of the private information and storing the information identifier, one information identifier corresponding to one piece of private information; and generating the information access address including the information identifier of the private information.

In various embodiments, during the acquiring an information identifier of the private information, the method further includes:

acquiring a check identifier and/or a time identifier corresponding to the private information, and storing the check identifier corresponding to the private information; and the generating the information access address including the information identifier of the private information includes:

generating the information access address including the information identifier of the private information and the check identifier and/or the time identifier corresponding to the private information.

Block 203: Return the information access address to the terminal through the network, so that the terminal generates a 2D barcode according to the information access address.

In the method provided in the various embodiments of the present disclosure, private information input by a user is sent to a server through a network, an information access address returned by the server through the network is received, and a 2D barcode including the information access address is generated. Therefore, generation of a 2D barcode is implemented without encrypting and decrypting, a cost of generating a 2D barcode is reduced, an application scope of a 2D barcode is broadened, and a generated 2D barcode includes an information access address so that security of private information is ensured.

Figure 3:
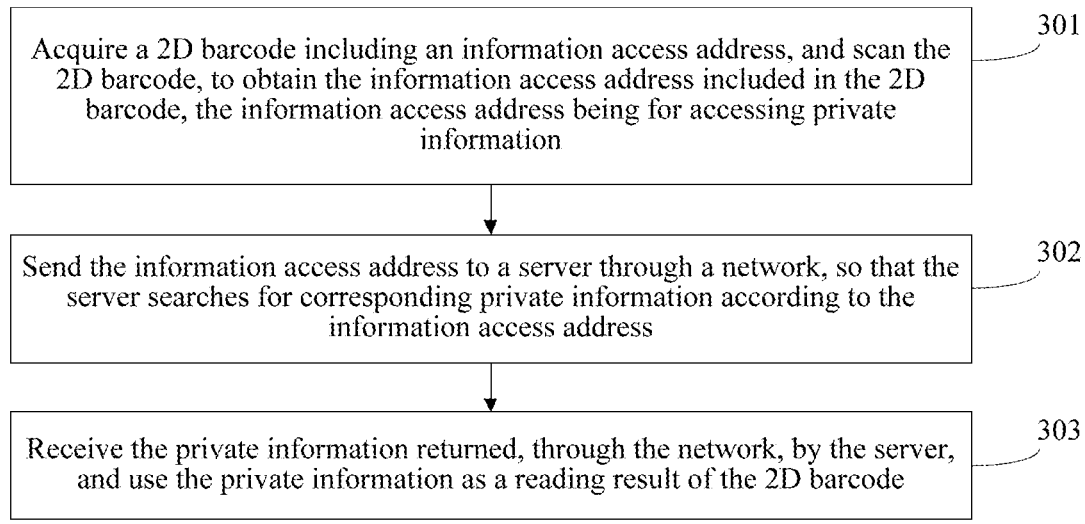
FIG. 3 is a flowchart of a first method for reading a 2D barcode according to various embodiments of the present disclosure.

In the above method for generating a 2D barcode provided in various embodiments, various embodiments of the present disclosure provide a method for reading a 2D barcode. The method is applicable to a system for reading a 2D barcode. The system includes a terminal and a server, and the terminal and the server are both in a network environment. By using an example of a perspective that a terminal executes the method provided in the various embodiments of the present disclosure, referring to FIG. 3, a procedure of the method includes the following.

Block 301: Acquire a 2D barcode including an information access address and scan the 2D barcode to obtain the information access address included in the 2D barcode, the information access address being for accessing private information.

Block 302: Send the information access address to a server through a network, so that the server searches for corresponding private information according to the information access address.

Block 303: Receive the private information returned through the network by the server, and use the private information as a reading result of the 2D barcode.

In various embodiments, the information access address at least includes an information identifier of the private information; and the receiving the private information returned through the network by the server includes:

receiving, after the server finds the private information according to the information identifier of the private information included in the information access address, the private information returned through the network.

In various embodiments, the information access address further includes a check identifier and/or a time identifier corresponding to the private information; and the receiving the private information returned through the network by the server includes:

receiving, after the server finds the private information according to an information identifier of the private information and the check identifier and/or the time identifier corresponding to the private information included in the information access address, the private information returned through the network.

Figure 4:
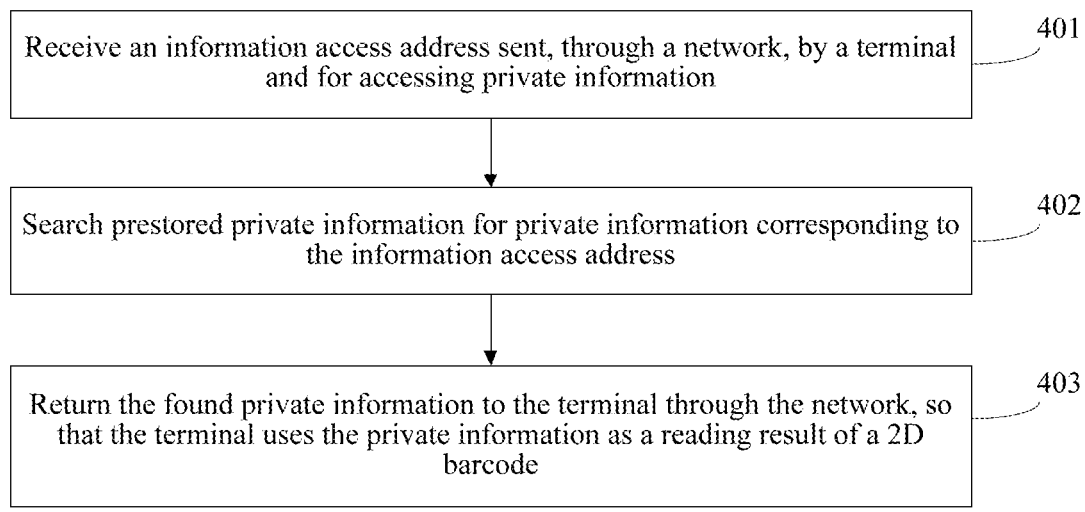
FIG. 4 is a flowchart of a second method for reading a 2D barcode according to various embodiments of the present disclosure.

Referring to FIG. 4, by using an example of a perspective that a server executes the method for reading a 2D barcode provided in the various embodiments of the present disclosure, a procedure of the method provided in the various embodiments of the present disclosure includes the following:

Block 401: Receive an information access address sent, through a network, by a terminal and for accessing private information.

Block 402: Search prestored private information for private information corresponding to the information access address.

In various embodiments, the information access address includes an information identifier of the private information; and the searching prestored private information for private information corresponding to the information access address includes:

searching the prestored private information for the private information corresponding to the information identifier included in the information access address.

As an optional embodiment, the information access address further includes a check identifier and/or a time identifier; and the searching the prestored private information for the private information corresponding to the information identifier included in the information access address includes:

determining whether the check identifier included in the information access address is consistent with a prestored check identifier, and/or determining whether the time identifier included in the information access address is ineffective; and executing, if the check identifier included in the information access address is consistent with the prestored check identifier, and/or the time identifier included in the information access address is not ineffective, the block of searching the prestored private information for the private information corresponding to the information identifier included in the information access address.

Block 403: Return the found private information to the terminal through the network, so that the terminal uses the private information as a reading result of a 2D barcode.

In the method provided in the various embodiments of the present disclosure, a 2D barcode including an information access address is acquired and scanned to obtain the information access address included in the 2D barcode, the information access address is sent to a server through a network, and the private information returned by the server through the network is received. Therefore, the reading of a 2D barcode is implemented without decrypting, a cost of reading a 2D barcode is reduced, an application scope of a 2D barcode is broadened, and a read 2D barcode includes an information access address so that security of private information is ensured.

Figure 5:
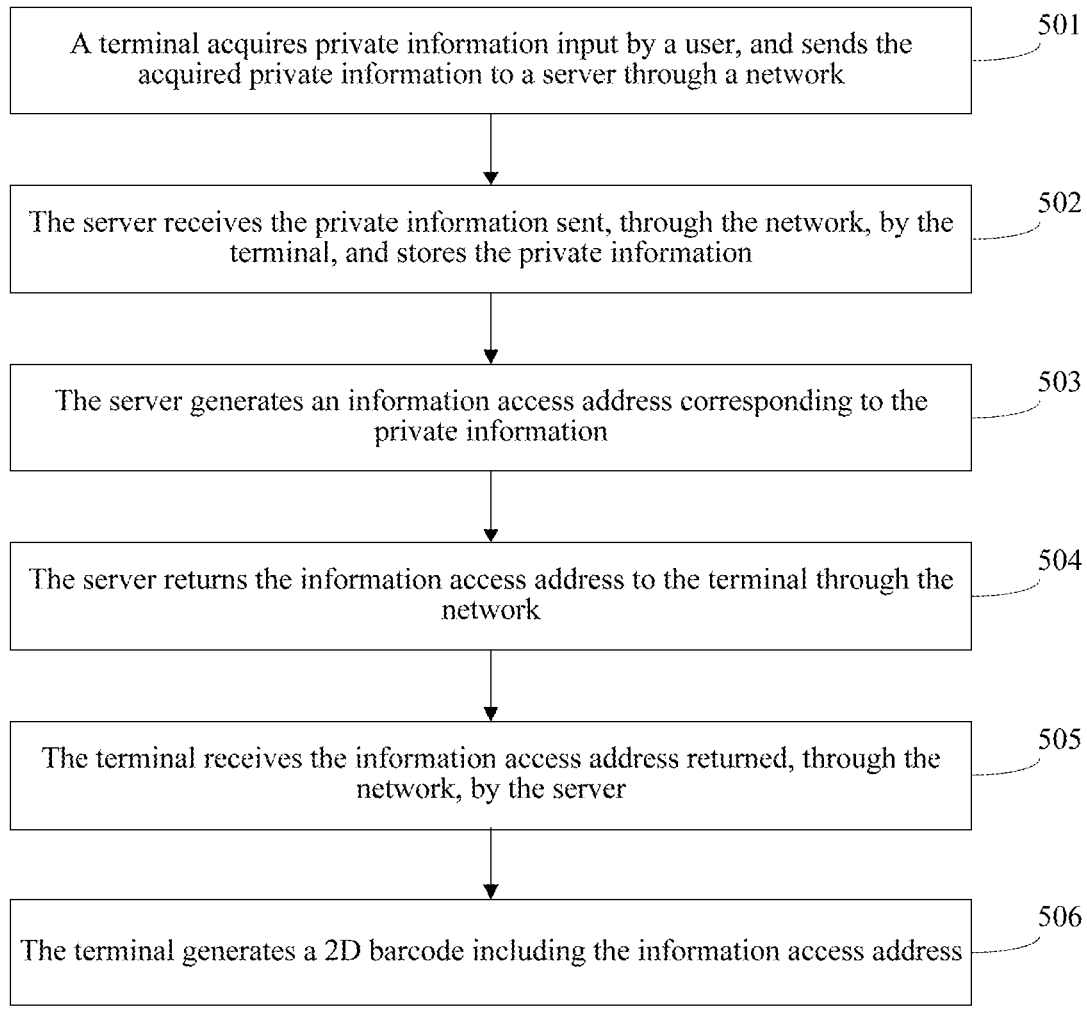
FIG. 5 is a flowchart of a method for generating a 2D barcode according to various embodiments of the present disclosure.

Various embodiments of the present disclosure provide a method for generating a 2D barcode. The method provided in the various embodiments of the present disclosure is described in detail with reference to the above content in other various embodiments. Referring to FIG. 5, a procedure of the method includes the following.

Block 501: A terminal acquires private information input by a user, and sends the acquired private information to a server through a network. A manner of acquiring private information input by a user is not limited in the various embodiments. Implementation includes, but is not limited to, providing an information input interface, the input interface being further provided with a submit button, and acquiring information input through the information input interface by a user, and using, when it is detected that the user clicks the submit button, the information input through the information input interface by the user as the acquired private information input by the user. To ensure security of the private information, the method provided in various embodiments includes, but is not limited to, sending the acquired private information to the server through the network. In addition, referring to an architecture diagram of a secure 2D barcode service system shown in FIG. 6, the secure 2D barcode service system 600 includes a client program 610 and an information storage subsystem 620. The client program 610 includes an information processing module 601 and a 2D barcode module 602. The information processing module 601 is connected to a user input, and the 2D barcode module 602 is connected to scanning of a 2D barcode by a user. The information storage subsystem 620 includes a data processing module 621, a network service module 622, and a 2D barcode information database 623. The network service module 622 is connected to the scanning of the 2D barcode by the user. The user input correspondingly acquires private information input by the user, and the information processing module 601 is configured to send the private information to a server through a network.

Block 502: The server receives the private information sent through the network by the terminal, and stores the private information. Referring to the architecture diagram of the secure 2D barcode service system shown in FIG. 6, the network service module 622 is configured to receive the private information sent through the network by the terminal, and transfer the private information to the data processing module 621, so that the data processing module 621 saves the private information in the 2D barcode information database.

In the method provided in the various embodiments of the present disclosure, private information is stored on a server, so that a generated 2D barcode does not include private information, so that security of private information is ensured. A manner in which the server stores the private information is not limited in the various embodiments, and includes, but is not limited to, storing each piece of private information according to an information identifier of the private information.

Block 503: The server generates an information access address corresponding to the private information. Because private information is stored on a server side, to access private information in the method provided in the various embodiments embodiment, the server generates the information access address corresponding to the private information, the information access address being for accessing the private information. During implementation, the generated information access address may be one Uniform Resource Locator (URL).

In various embodiments, the generating an information access address corresponding to the private information includes, but is not limited to the following:

acquiring an information identifier of the private information, and storing the information identifier, one information identifier corresponding to one piece of private information; and generating the information access address including the information identifier of the private information.

A manner of acquiring the information identifier of the private information is not limited in the various embodiments. Implementation includes, but is not limited to, calculating a Message Digest Algorithm 5 (MD5) value according to the entire private information, and the MD5 value is a 64-bit 8-byte integral type. The MD5 value is used as the acquired information identifier of the private information. Because one information identifier corresponds to one piece of private information, an information identifier is used as an information access address, so that private information may be accessed by using an information identifier.

As an optional embodiment, during the acquiring an information identifier of the private information, the method further includes, but is not limited to the following:

acquiring a check identifier and/or a time identifier corresponding to the private information, and storing the check identifier corresponding to the private information; and the generating the information access address including the information identifier of the private information includes:

generating the information access address including the information identifier of the private information and the check identifier and/or the time identifier corresponding to the private information.

The foregoing procedure may be categorized into the following three cases.

In a first case, during the acquiring an information identifier of the private information, a check identifier corresponding to the private information may be acquired, and the check identifier corresponding to the private information may be stored. The information access address including the information identifier of the private information and the check identifier corresponding to the private information is generated.

In a second case, during the acquiring an information identifier of the private information, a time identifier corresponding to the private information may be acquired; and the information access address including the information identifier of the private information and the time identifier corresponding to the private information is generated.

In a third case, during the acquiring an information identifier of the private information, a check identifier and a time identifier corresponding to the private information may be acquired, and the check identifier and the time identifier corresponding to the private information are stored. The information access address including the information identifier of the private information and the check identifier and the time identifier corresponding to the private information is generated.

None of the manners of acquiring a check identifier and/or a time identifier corresponding to the private information are limited in the various embodiments. Various implementations include, but is not limited to, randomly generating a 64-bit 8-byte integral type value, and using the value as the acquired check identifier corresponding to the private information, the check identifier being for checking the validity of the information access address, and generating a 64-bit 8-byte integral type timestamp according to server time, and using the timestamp as the acquired time identifier corresponding to the private information, the time identifier being for checking effectiveness of information access address.

When the information access address includes both the information identifier of the private information, the check identifier corresponding to the private information, and the time identifier corresponding to the private information, the generated information access address may be http://domain name/qrc?id=user information ID, check KEY value, and timestamp. The information access address includes one parameter id, and parameter values are a user information ID, a check KEY value, and a timestamp. The user information ID corresponds to the information identifier of the private information, the check KEY value corresponds to the check identifier corresponding to the private information, and the timestamp corresponds to the time identifier corresponding to the private information.

Figure 6:
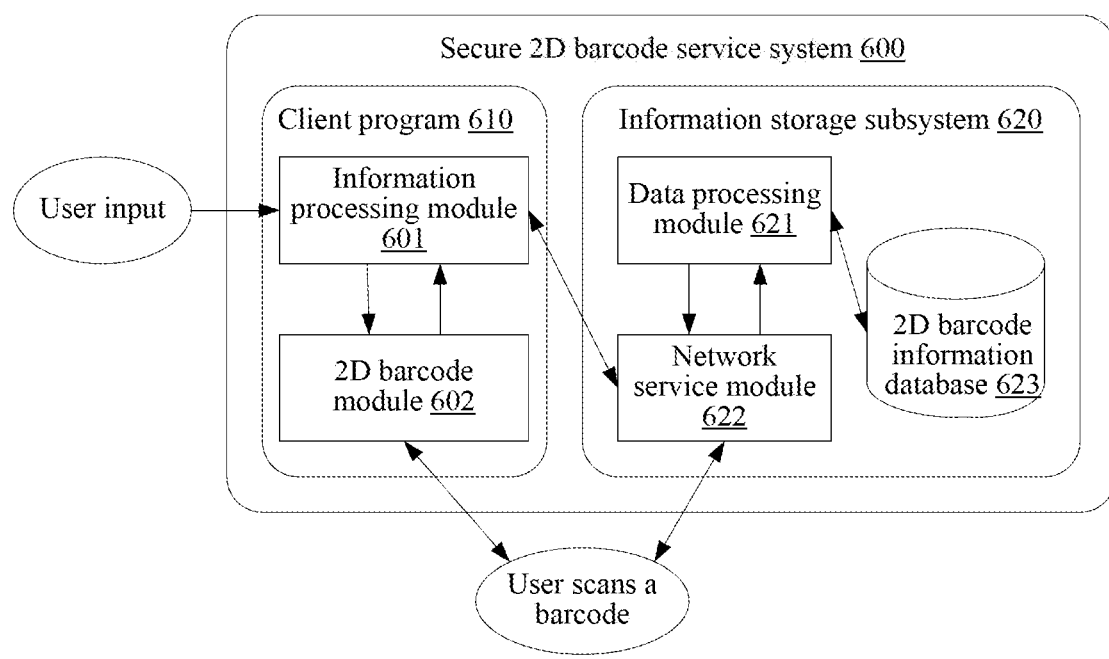
FIG. 6 is a block diagram of a secure 2D barcode service system according to various embodiments of the present disclosure.

Further, referring to the architecture diagram of the secure 2D barcode service system 600 shown in FIG. 6, the data processing module 621 is configured to generate the information access address corresponding to the private information.

Block 504: The server returns the information access address to the terminal through the network. According to various embodiments, a manner of returning the information access address to the terminal through the network is not limited. During implementation, referring to the architecture diagram of the secure 2D barcode service system 600 shown in FIG. 6, after generating the information access address corresponding to the private information, the data processing module 621 may send the private address to the network service module 622, and the network service module 622 returns the information access address to the terminal through the network.

Block 505: The terminal receives the information access address returned through the network by the server. Referring to the architecture diagram of the secure 2D barcode service system 600 shown in FIG. 6, the information processing module 601 is configured to receive the information access address returned through the network by the server. In various embodiments, after receiving the information access address returned, through the network, by the server, the information processing module 601 may further store the information access address, and display whether the private information is successfully processed.

Block 506: The terminal generates a 2D barcode including the information access address. Referring to the architecture diagram of the secure 2D barcode service system 600 shown in FIG. 6, the 2D barcode module 602 is configured to generate the 2D barcode including the information access address. The generated 2D barcode may be a QR 2D barcode. The generated 2D barcode does not include private information, therefore security of the private information is ensured. In various embodiments, after generating the 2D barcode including the information access address, the 2D barcode module 602 may further display the 2D barcode.

Figure 7:
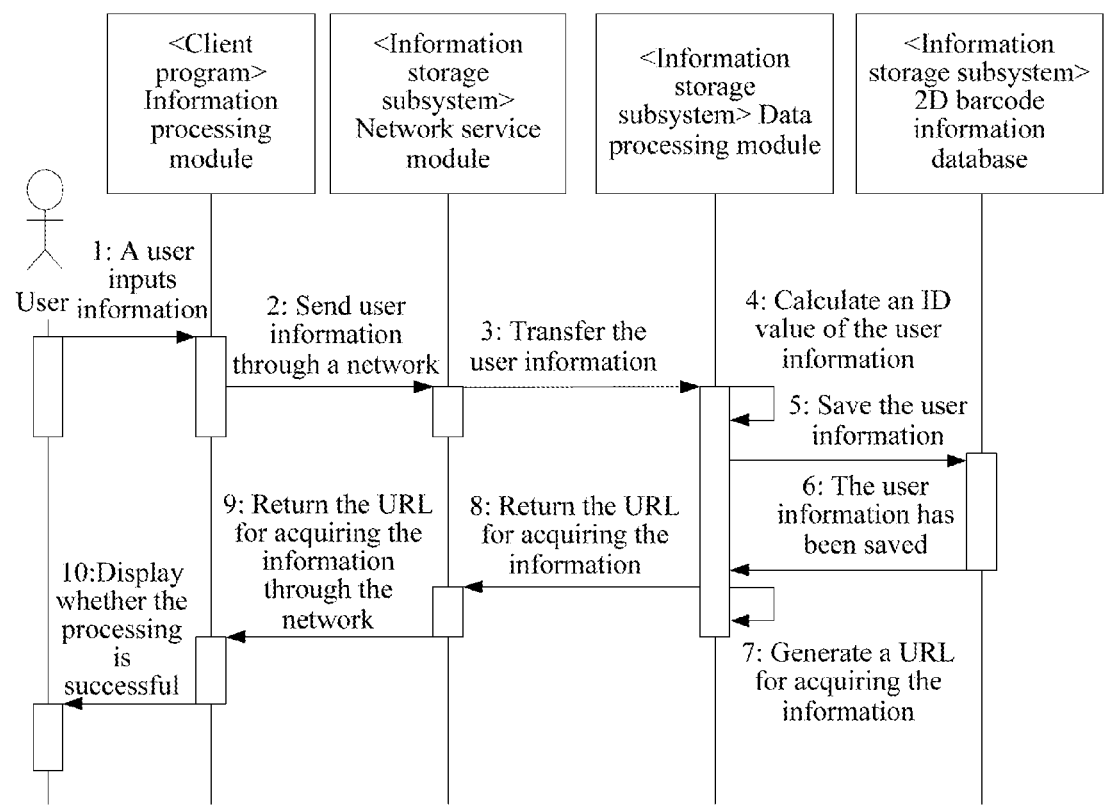
FIG. 7 is a flowchart of saving, by the secure 2D barcode service system, information input by a user according to various embodiments of the present disclosure.

In addition, referring to a flowchart of saving information input by user by a secure 2D barcode service system shown in FIG. 7, block 501 corresponds to that a user inputs information, and user information is sent through a network. Blocks 502 and 503 correspond to when the user information is transferred. An ID value of the user information is calculated, the user information is saved, and once the user information has been saved, a URL for acquiring the information is generated. Blocks 504 and 505 correspond to when the URL for acquiring the information is returned, and once the URL for acquiring the information is returned through the network, whether processing is successful is displayed.

In the method provided in the various embodiments, private information input by a user is sent to a server through a network, an information access address returned by the server through the network is received, and a 2D barcode including the information access address is generated. Therefore, generation of a 2D barcode is implemented without encrypting, a cost of generating a 2D barcode is reduced, an application scope of a 2D barcode is broadened, and a generated 2D barcode includes an information access address, so that security of private information is ensured.

Figure 8:
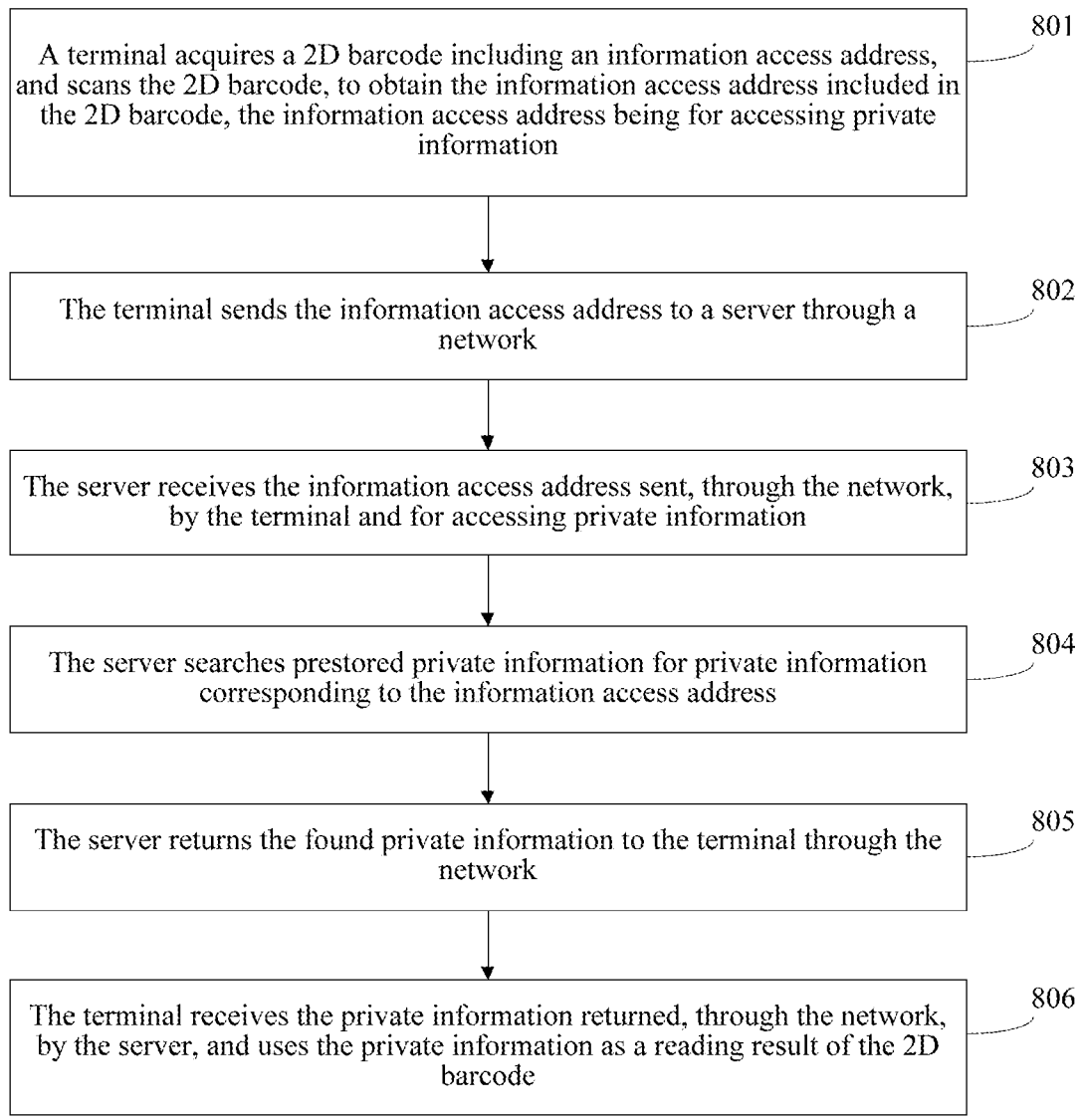
FIG. 8 is a flowchart of a method for reading a 2D barcode according to various embodiments of the present disclosure.

With reference to the method for generating a 2D barcode provided in various embodiments, various other embodiments of the present disclosure provide a method for reading a 2D barcode. With reference to the content of various embodiments described above, the method provided in the various embodiments of the present disclosure is described in detail. Referring to FIG. 8, a procedure of the method includes the following.

Block 801: A terminal acquires a 2D barcode including an information access address, and scans the 2D barcode to obtain the information access address included in the 2D barcode, the information access address being for accessing private information. Neither of the manners of acquiring a 2D barcode including an information access address and scanning the 2D barcode are limited in the various embodiments. During implementation, a 2D barcode may be generated by using the method provided in various embodiments described above, and the 2D barcode is used as the acquired 2D barcode including the information access address. After the 2D barcode is acquired, the 2D barcode may be scanned by using a 2D barcode scanning device. The 2D barcode scanning device may be a mobile phone, a tablet computer, and the like. Because the acquired 2D barcode includes the information access address, after the 2D barcode is scanned, the information access address included in the 2D barcode may be obtained, the information access address being for accessing private information.

Further, referring to an architecture diagram of the secure 2D barcode service system 600 shown in FIG. 6, a user scans a 2D barcode to correspondingly acquire a 2D barcode including an information access address, and a 2D barcode module 602 is configured to scan the 2D barcode to obtain the information access address included in the 2D barcode.

Block 802: The terminal sends the information access address to a server through a network. To enable acquisition of private information according to an information access address, in the method provided in the various embodiments, the information access address is sent to the server through the network. A manner of sending is not limited in the various embodiments. During implementation, referring to the architecture diagram of the secure 2D barcode service system 600 shown in FIG. 6, the information processing module 601 may send the information access address to the server through the network. The information access address may be a URL of a network Hyper Text Transfer Protocol (HTTP)/Hypertext Transfer Protocol over Secure Socket Layer (HTTPS) request.

Block 803: The server receives the information access address sent through the network by the terminal and for accessing private information. Referring to the architecture diagram of the secure 2D barcode service system 600 shown in FIG. 6, the network service module 622 is configured to receive the information access address sent through the network by the terminal and for accessing private information, and transfer the information access address to the data processing module 621.

Block 804: The server searches prestored private information for private information corresponding to the information access address. In various embodiments, a manner of searching for the private information corresponding to the information access address is not limited. During implementation, because the information access address is for accessing private information, the prestored private information may be directly searched for the private information corresponding to the information access address.

In various embodiments, the information access address includes an information identifier of the private information; and the searching prestored private information for private information corresponding to the information access address includes:

searching the prestored private information for the private information corresponding to the information identifier included in the information access address.

By using the information identifier, the prestored private information may be rapidly searched for the private information corresponding to the information identifier included in the information access address.

As an optional embodiment, the information access address further includes a check identifier and/or a time identifier. The searching the prestored private information for the private information corresponding to the information identifier included in the information access address includes the following:

determining whether the check identifier included in the information access address is consistent with a prestored check identifier, and/or determining whether the time identifier included in the information access address is ineffective; and executing, if the check identifier included in the information access address is consistent with the prestored check identifier, and/or the time identifier included in the information access address is not ineffective, the block of searching the prestored private information for the private information corresponding to the information identifier included in the information access address.

The information access address provided in the various embodiments may include the information identifier of the private information, or may further include the information identifier of the private information and the check identifier corresponding to the private information, or may further include the information identifier of the private information and the time identifier corresponding to the private information, or may further include the information identifier of the private information, the check identifier corresponding to the private information, and the time identifier corresponding to the private information. In reference to the four types of information access addresses during the search for the private information, four cases are included as follow.

First, when the information access address includes the information identifier of the private information, the prestored private information is directly searched for the private information corresponding to the information identifier included in the information access address.

Second, when the information access address includes the information identifier of the private information and the check identifier corresponding to the private information, it is determined whether the check identifier included in the information access address is consistent with the prestored check identifier; and when the check identifier included in the information access address is consistent with the prestored check identifier, the block of searching the prestored private information for the private information corresponding to the information identifier included in the information access address is executed.

Third, when the information access address includes the information identifier of the private information and the time identifier corresponding to the private information, it is determined whether the time identifier included in the information access address is ineffective. When the time identifier included in the information access address is not ineffective, the block of searching the prestored private information for the private information corresponding to the information identifier included in the information access address is executed.

Fourth, when the information access address includes the information identifier of the private information, the check identifier corresponding to the private information, and the time identifier corresponding to the private information, it is determined whether the check identifier included in the information access address is consistent with the prestored check identifier. When the check identifier included in the information access address is consistent with the prestored check identifier, it is determined whether the time identifier included in the information access address is ineffective, and when the time identifier included in the information access address is not ineffective, the block of searching the prestored private information for the private information corresponding to the information identifier included in the information access address is executed.

An example in which the information identifier corresponds to a user information ID, the check identifier corresponds to a check KEY value, and the time identifier corresponds to a timestamp is used for description. When it is determined that the check KEY value included in the information access address is consistent with the prestored check KEY value, it is determined that the information access address is effective, and when it is determined that the check KEY value included in the information access address is inconsistent with the prestored check KEY value, it is determined that the information access address is ineffective, and it is returned that acquisition of private information fails.

The determination of whether the time identifier included in the information access address is ineffective includes, but is not limited to, comparing time recorded in the timestamp with time of a current server. If a difference value between the time recorded in the timestamp and the time of the current server is greater than a preset time threshold, it is determined that the time identifier included in the information access address is ineffective, and it is returned that acquisition of private information fails. If the difference value between the time recorded in the timestamp and the time of the current server is not greater than the preset time threshold, it is determined that the time identifier included in the information access address is effective. The preset time threshold may be 5 minutes. In addition to the above preset time threshold, other preset time thresholds such as 4 minutes and 6 minutes may be further used, and are limited in the various embodiments.

Further, referring to the architecture diagram of the secure 2D barcode service system 600 shown in FIG. 6, the data processing module 621 is configured to search the prestored private information for the private information corresponding to the information access address, the prestored private information being stored in the 2D barcode information database.

Block 805: The server returns the found private information to the terminal through the network. According to various embodiments, a manner of returning the found private information to the terminal through the network is not limited. During implementation, referring to the architecture diagram of the secure 2D barcode service system 600 shown in FIG. 6, after finding the private information corresponding to the information access address from the prestored private information, the data processing module 621 sends the found private information to the network service module 622, so that the network service module 622 returns the found private information to the terminal through the network.

Block 806: The terminal receives the private information returned, through the network, by the server, and uses the private information as a reading result of the 2D barcode. Referring to the architecture diagram of the secure 2D barcode service system 600 shown in FIG. 6, the information processing module 601 is configured to receive the private information returned, through the network, by the server, and use the private information as a reading result of the 2D barcode.

Figure 9:
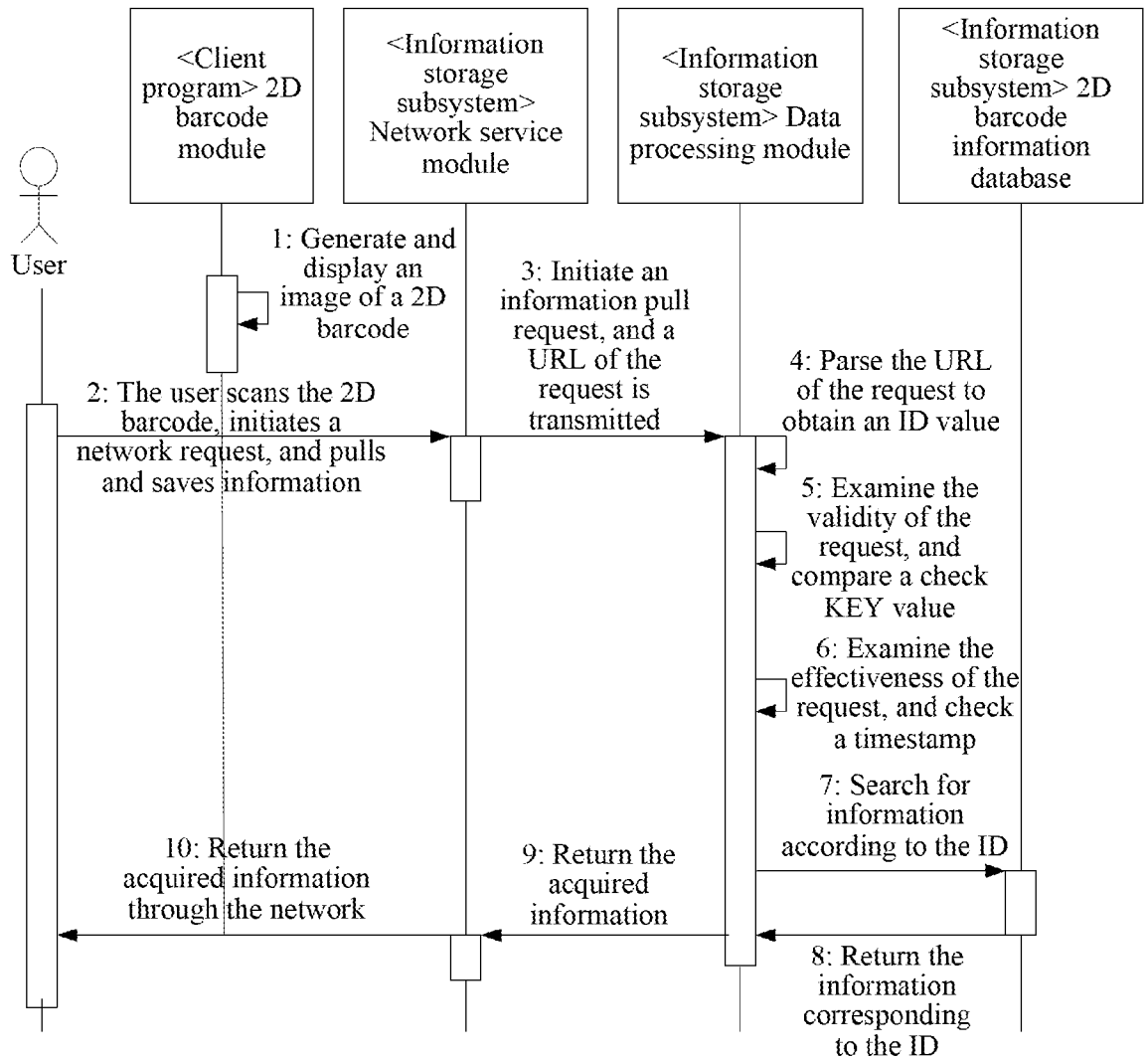
FIG. 9 is a flowchart of saving, by a secure 2D barcode service system, information acquired by a user by scanning a 2D barcode according to various embodiments of the present disclosure.

In addition, referring to a flowchart of saving, by a secure 2D barcode service system, information acquired by a user by scanning a 2D barcode shown in FIG. 9, blocks 801 and 802 correspond to when a picture of a 2D barcode is generated and displayed, a user scans the 2D barcode and initiates a network request, and pulls and saves information. Blocks 803 and 804 correspond to when an information pull request is initiated, a URL of the request is transmitted, the URL of the request is parsed, an ID value is acquired, the validity of the request is examined, a check KEY value is compared, a comparison result is returned, effectiveness of the request is examined, a timestamp is checked, it is checked that the timestamp fails, the check result is returned, and information is searched for according to an ID. Blocks 805 and 806 correspond to when the information corresponding to the ID is returned, the acquired information is returned, and the acquired information is returned through the network.

In the method provided in the various embodiments, a 2D barcode including an information access address is acquired and scanned to obtain the information access address included in the 2D barcode, the information access address is sent to a server through a network, and private information returned by the server through the network is then received. Therefore, reading of a 2D barcode is implemented without decrypting, a cost of reading a 2D barcode is reduced, an application scope of a 2D barcode is broadened, and a read 2D barcode includes an information access address, so that security of private information is ensured.

Figure 10:
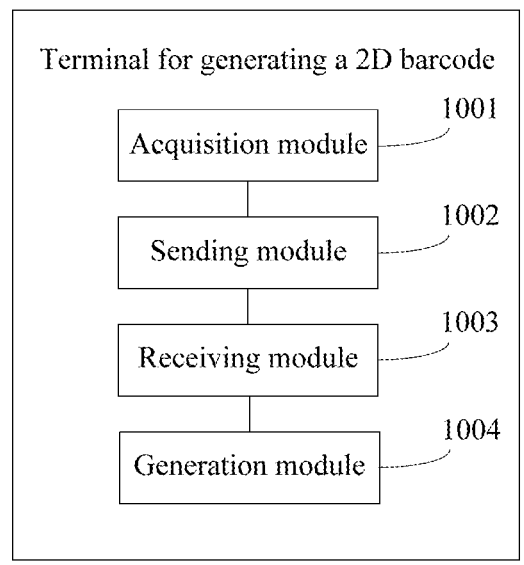
FIG. 10 is a block diagram of a terminal for generating a 2D barcode according to various embodiments of the present disclosure.

Referring to FIG. 10, various embodiments of the present disclosure provide a terminal for generating a 2D barcode, the terminal includes the following:

an acquisition module 1001, configured to acquire private information input by a user;

a sending module 1002, configured to send the private information to a server through a network, so that the server stores the private information, and generates an information access address corresponding to the private information;

a receiving module 1003, configured to receive an information access address returned, through the network, by the server; and a generation module 1004, configured to generate a 2D barcode including the information access address.

In various embodiments, the receiving module 1003 is configured to receive the information access address that is returned by the server through the network and at least includes an information identifier of the private information. In various embodiments, the receiving module 1003 is configured to receive the information access address returned by the server through the network and at least includes an information identifier of the private information and a check identifier and/or a time identifier corresponding to the private information.

In the terminal provided in the various embodiments, private information input by a user is sent to a server through a network, an information access address returned by the server through the network is received, and a 2D barcode including the information access address is generated. Therefore, generation of a 2D barcode is implemented without encrypting, a cost of generating a 2D barcode is reduced, an application scope of a 2D barcode is broadened, and a generated 2D barcode includes an information access address, so that security of private information is ensured.

Figure 11:
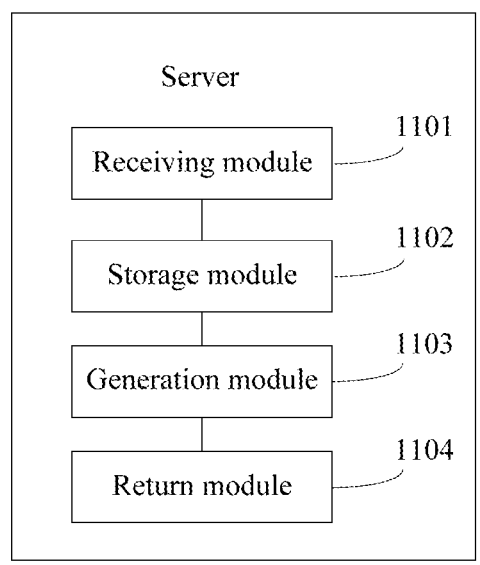
FIG. 11 is a block diagram of a server according to various embodiments of the present disclosure.

Referring to FIG. 11, various embodiments of the present disclosure provide a server, the server includes the following:

a receiving module 1101, configured to receive private information sent, through a network, by a terminal;

a storage module 1102, configured to store the private information;

a generation module 1103, configured to generate an information access address corresponding to the private information; and a return module 1104, configured to return the information access address to the terminal through the network, so that the terminal generates a 2D barcode according to the information access address.

Figure 12:
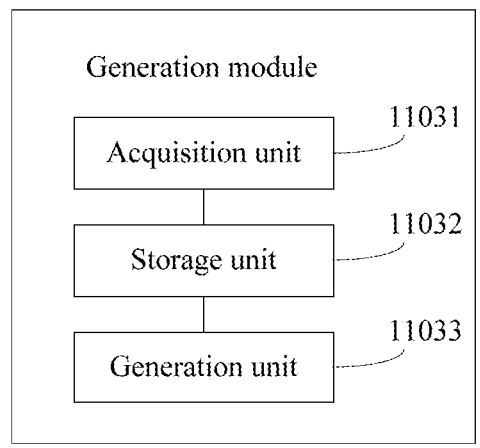
FIG. 12 is a block diagram of a generation module according to various embodiments of the present disclosure.

In various embodiments, referring to FIG. 12, the generation module 1103 includes the following:

an acquisition unit 11031, configured to acquire an information identifier of the private information;

a storage unit 11032, configured to store the information identifier, one information identifier corresponding to one piece of private information; and a generation unit 11033, configured to generate the information access address including the information identifier of the private information.

In various embodiments, the acquisition unit 11031 is further configured to, when an information identifier of the private information is acquired, acquire a check identifier and/or a time identifier corresponding to the private information. The storage unit 11032 is further configured to store the check identifier corresponding to the private information. The generation unit 11033 is configured to generate the information access address including the information identifier of the private information and the check identifier and/or the time identifier corresponding to the private information.

In the server provided in the various embodiments of the present disclosure, private information sent by a terminal through a network is received and stored, and an information access address corresponding to the private information is generated and returned to the terminal through the network, so that the terminal generates a 2D barcode according to the information access address. Therefore, generation of a 2D barcode is implemented without encrypting, a cost of generating a 2D barcode is reduced, an application scope of a 2D barcode is broadened, and a generated 2D barcode includes an information access address, so that security of private information is ensured.

Figure 13:
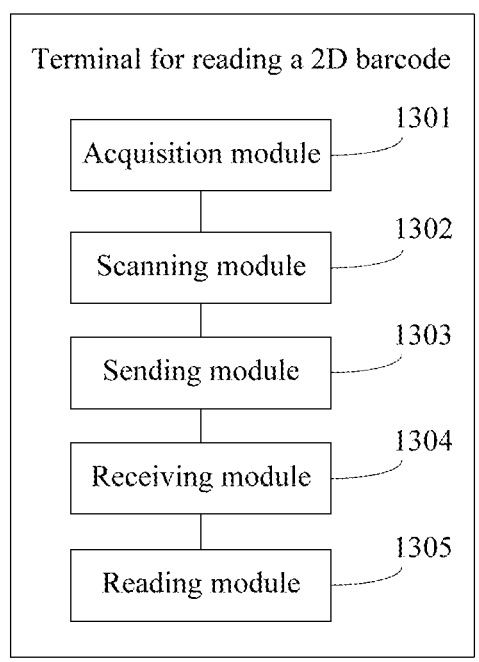
FIG. 13 is a block diagram of a terminal for reading a 2D barcode according to various embodiments of the present disclosure.

Referring to FIG. 13, various embodiments of the present disclosure provide a terminal for reading a 2D barcode, the terminal includes the following:

an acquisition module 1301, configured to acquire a 2D barcode including an information access address;

a scanning module 1302, configured to scan the 2D barcode, to obtain the information access address included in the 2D barcode, the information access address being for accessing private information;

a sending module 1303, configured to send the information access address to a server through a network, so that the server searches for corresponding private information according to the information access address;

a receiving module 1304, configured to receive the private information returned through the network by the server; and a reading module 1305, configured to use the private information as a reading result of the 2D barcode.

In various embodiments, the information access address obtained through scanning by the scanning module 1302 at least includes an information identifier of the private information, and the receiving module 1304 is configured to receive, after the server finds the private information according to the information identifier of the private information included in the information access address, the private information returned through the network. In various embodiments, the information access address obtained through scanning by the scanning module 1302 further includes a check identifier and/or a time identifier corresponding to the private information, and the receiving module 1304 is configured to receive, after the server finds the private information according to an information identifier of the private information and the check identifier and/or the time identifier corresponding to the private information included in the information access address, the private information returned through the network.

In the terminal provided in the various embodiments, a 2D barcode including an information access address is acquired and scanned to obtain the information access address included in the 2D barcode, the information access address is sent to a server through a network, and private information returned by the server through the network is then received. Therefore, reading of a 2D barcode is implemented without decrypting, a cost of reading a 2D barcode is reduced, an application scope of a 2D barcode is broadened, and a read 2D barcode includes an information access address, so that security of private information is ensured.

Figure 14:
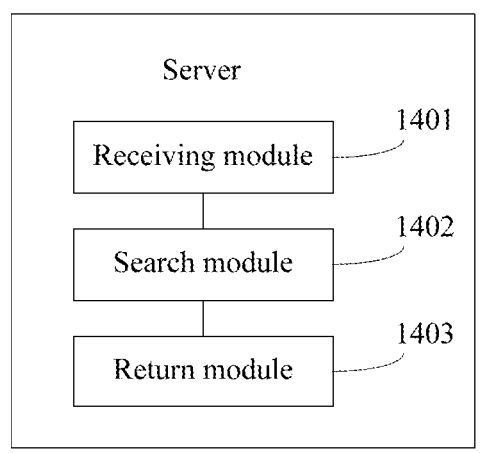
FIG. 14 is a block diagram of a server according to various embodiments of the present disclosure.

Referring to FIG. 14, various embodiments of the present disclosure provide a server, the server includes the following:

a receiving module 1401, configured to receive an information access address sent, through a network, by a terminal and for accessing private information;

a search module 1402, configured to search prestored private information for private information corresponding to the information access address; and a return module 1403, configured to return the found private information to the terminal through the network, so that the terminal uses the private information as a reading result of a 2D barcode.

In various embodiments, the information access address received by the receiving module 1401 includes an information identifier of the private information, and the search module 1402 is configured to search the prestored private information for the private information corresponding to the information identifier included in the information access address. In various embodiments, the information access address received by the receiving module 1401 further includes a check identifier and/or a time identifier.

Figure 15:
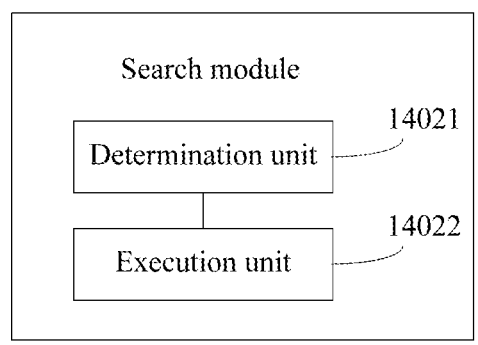
FIG. 15 is a block diagram of a search module according to various embodiments of the present disclosure.

Referring to FIG. 15, the search module 1402 includes the following:

a determination unit 14021, configured to determine whether the check identifier included in the information access address is consistent with a prestored check identifier, and/or determine whether the time identifier included in the information access address is ineffective; and an execution unit 14022, configured to execute, when the check identifier included in the information access address is consistent with the prestored check identifier, and/or the time identifier included in the information access address is not ineffective, the block of searching the prestored private information for the private information corresponding to the information identifier included in the information access address.

In the server provided in the various embodiments, an information access address sent by a terminal through a network and for accessing private information is received, and private information corresponding to the information access address found from prestored private information is returned to the terminal through the network, so that the terminal uses the private information as a reading result of a 2D barcode. Therefore, reading of a 2D barcode is implemented without decrypting, a cost of reading a 2D barcode is reduced, an application scope of a 2D barcode is broadened, and a read 2D barcode includes an information access address, so that security of private information is ensured.

Figure 16:
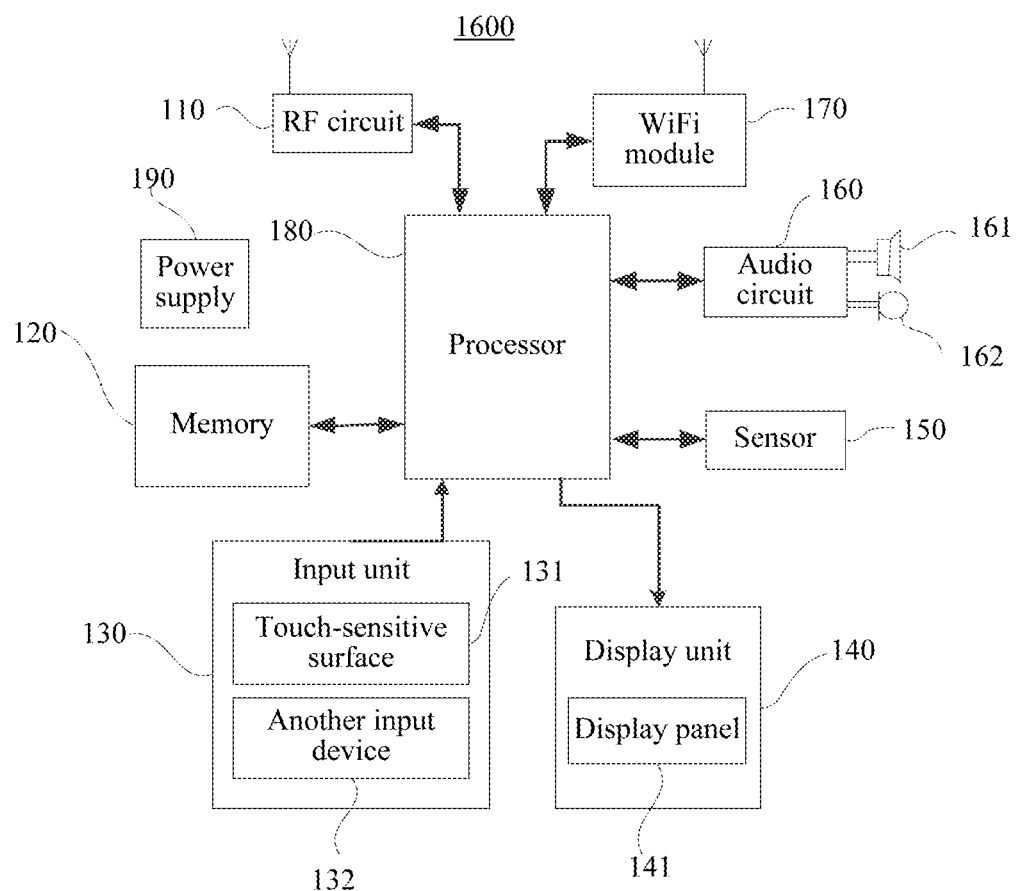
FIG. 16 is a block diagram of a terminal according to various embodiments of the present disclosure.

Various embodiments of the present disclosure provide a terminal. FIG. 16, is a schematic structural diagram of a terminal involved in the various embodiments embodiment of the present disclosure, and the terminal may be configured to implement the method for generating a 2D barcode provided in the above various embodiments.

The terminal 1600 may include components such as a Radio Frequency (RF) circuit 110, a memory 120 including one or more computer readable storage media, an input unit 130, a display unit 140, a sensor 150, an audio circuit 160, a Wireless Fidelity (WiFi) module 170, a processor 180 including one or more processing cores, and a power supply 190. A person skilled in the art will recognize that the structure of the terminal shown in FIG. 16 does not constitute a limitation to the terminal, and the terminal may include more components or fewer components than those shown in the figure, or some components may be combined, or a different component deployment may be used.

The RF circuit 110 may be configured to receive and send signals during an information receiving and sending process or a call process. Particularly, downlink information from a base station is received and then delivered to one or more processors 180 for processing. In addition, related uplink data is sent to the base station. The RF circuit 110 includes, but is not limited to, an antenna, at least one amplifier, a tuner, one or more oscillators, a subscriber identity module (SIM) card, a transceiver, a coupler, a low noise amplifier (LNA), and a duplexer. In addition, the RF circuit 110 may also communicate with a network and another device by wireless communication. The wireless communication may use any communications standard or protocol, which includes, but is not limited to, Global System for Mobile communications (GSM), General Packet Radio Service (GPRS), Code Division Multiple Access (CDMA), Wideband Code Division Multiple Access (WCDMA), Long Term Evolution (LTE), e-mail, Short Messaging Service (SMS), and the like.

The memory 120 may be configured to store a software program and module. The processor 180 runs the software program and module stored in the memory 120, to implement various functional applications and data processing. The memory 120 may mainly include a program storage area and a data storage area. The program storage area may store an operating system, an application program necessary for at least one function (such as a sound playback function and an image display function), and the like. The data storage area may store data (such as audio data and an address book) created according to use of the terminal 1600, and the like. In addition, the memory 120 may include a high speed random access memory, and may also include a non-volatile memory, such as at least one magnetic disk storage device, a flash memory, or another volatile solid-state storage device. Accordingly, the memory 120 may further include a memory controller, so that the processor 180 and the input unit 130 access the memory 120.

The input unit 130 may be configured to receive input digit or character information, and generate a keyboard, mouse, joystick, optical, or track ball signal input related to the user setting and function control. The input unit 130 may include a touch-sensitive surface 131 and another input device 132. The touch-sensitive surface 131, which may also be referred to as a touch screen or a touch panel, may collect a touch operation of a user on or near the touch-sensitive surface (such as an operation of a user on or near the touch-sensitive surface 131 by using any suitable object or accessory, such as a finger or a stylus), and drive a corresponding connection apparatus according to a preset program. Optionally, the touch-sensitive surface 131 may include two parts, including a touch detection apparatus and a touch controller. The touch detection apparatus detects a touch position of the user, detects a signal generated by the touch operation, and transfers the signal to the touch controller. The touch controller receives the touch signal from the touch detection apparatus, converts the touch signal into touch point coordinates, and sends the touch point coordinates to the processor 180. Moreover, the touch controller can receive and execute a command sent from the processor 180. In addition, the touch-sensitive surface 131 may be may be a resistive, capacitive, infrared, or surface sound wave type touch-sensitive surface. In addition to the touch-sensitive surface 131, the input unit 130 may further include the another input device 132. The another input device 132 may include, but is not limited to, one or more of a physical keyboard, a functional key (such as a volume control key or a switch key), a track ball, a mouse, and a joystick.

The display unit 140 may be configured to display information input by the user or information provided for the user, and various graphical user interfaces of the terminal 1600. The graphical user interfaces may be formed by a graph, a text, an icon, a video, and any combination thereof. The display unit 140 may include a display panel 141. Optionally, the display panel 141 may be configured by using a liquid crystal display (LCD), an organic light-emitting diode (OLED), or the like. Further, the touch-sensitive surface 131 may cover the display panel 141. After detecting a touch operation on or near the touch-sensitive surface 131, the touch-sensitive surface 131 transfers the touch operation to the processor 180, so as to determine the type of the touch event. The processor 180 then provides a corresponding visual output on the display panel 141 according to the type of the touch event. Although, in FIG. 16, the touch-sensitive surface 131 and the display panel 141 are used as two separate parts to implement input and output functions, in various embodiments, the touch-sensitive surface 131 and the display panel 141 may be integrated to implement the input and output functions.

The terminal 1600 may further include at least one sensor 150, such as an optical sensor, a motion sensor, and other sensors. The optical sensor may include an ambient light sensor and a proximity sensor. The ambient light sensor may adjust luminance of the display panel 141 according to brightness of the ambient light. The proximity sensor may switch off the display panel 141 and/or backlight when the terminal 1600 is moved to the ear. As one type of motion sensor, a gravity acceleration sensor may detect magnitude of accelerations in various directions (generally on three axes), may detect magnitude and a direction of the gravity when static, and may be applied to an application that recognizes the attitude of the mobile phone (for example, switching between landscape orientation and portrait orientation, a related game, and magnetometer attitude calibration), a function related to vibration recognition (such as a pedometer and a knock), and the like. Other sensors, such as a gyroscope, a barometer, a hygrometer, a thermometer, and an infrared sensor, which may be configured in the terminal 1600, are not further described herein.

The audio circuit 160, a loudspeaker 161, and a microphone 162 may provide audio interfaces between the user and the terminal 1600. The audio circuit 160 may convert received audio data into an electric signal and transmit the electric signal to the loudspeaker 161. The loudspeaker 161 converts the electric signal into a sound signal for output. The microphone 162 converts a collected sound signal into an electric signal. The audio circuit 160 receives the electric signal and converts the electric signal into audio data, and outputs the audio data to the processor 180 for processing. Then, the processor 180 sends the audio data to, for example, another terminal by using the RF circuit 110, or outputs the audio data to the memory 120 for further processing. The audio circuit 160 may further include an earplug jack, so as to provide communication between a peripheral earphone and the terminal 1600.

Wi-Fi is a short distance wireless transmission technology. The terminal 1600 may help, by using the Wi-Fi module 170, the user to receive and send e-mails, browse a webpage, access stream media, and so on, which provides wireless broadband Internet access for the user. Although FIG. 16 shows the Wi-Fi module 170, the wireless communications unit is not a necessary component of the terminal 1600, and when necessary, the wireless communications unit may be omitted as long as the scope of the essence of the present disclosure is not changed.

The processor 180 is the control center of the terminal 1600, and is connected to various parts of the mobile phone by using various interfaces and lines. By running or executing the software program and/or module stored in the memory 120, and invoking data stored in the memory 120, the processor 180 performs various functions and data processing of the terminal 1600, thereby performing overall monitoring on the mobile phone. Optionally, the processor 180 may include one or more processing cores. The processor 180 may integrate an application processor and a modem. The application processor mainly processes an operating system, a user interface, an application program, and the like. The modem mainly processes wireless communication. The foregoing modem may also not be integrated into the processor 180.

The terminal 1600 further includes the power supply 190 (such as a battery) for supplying power to the components. The power supply may be logically connected to the processor 180 by using a power management system, thereby implementing functions such as charging, discharging and power consumption management by using the power management system. The power supply 190 may further include any component, such as one or more direct current or alternate current power supplies, a re-charging system, a power supply fault detection circuit, a power supply converter or an inverter, and a power supply state indicator.

Although not shown in the figure, the terminal 1600 may further include a camera, a Bluetooth module, and the like, which are not further described herein. According to various embodiments, the display unit of the terminal is a touch screen display, and the terminal further includes a memory and one or more programs. The one or more programs are stored in the memory and configured to be executed by one or more processors. The one or more programs contain instructions for executing the following operations:

acquiring private information input by a user, and sending the private information to a server through a network, so that the server stores the private information, and generates an information access address corresponding to the private information;

receiving an information access address returned, through the network, by the server; and generating a 2D barcode including the information access address.

Assuming that the above is one various embodiment, in a second various embodiment provided on the basis of the one various embodiment, the memory of the terminal further includes an instruction for executing the following operation as follows.

The receiving an information access address returned, through the network, by the server includes receiving the information access address that is returned by the server through the network and at least includes an information identifier of the private information.

In another various embodiment based on one various embodiment, the memory of the terminal further includes an instruction for executing the following operation:

the receiving an information access address returned, through the network, by the server includes receiving the information access address that is returned by the server through the network and at least includes an information identifier of the private information and a check identifier and/or a time identifier corresponding to the private information.

In the terminal provided in the various embodiments of the present disclosure, private information input by a user is sent to a server through a network, an information access address returned by the server through the network is received, and a 2D barcode including the information access address is generated. Therefore, generation of a 2D barcode is implemented without encrypting, a cost of generating a 2D barcode is reduced, an application scope of a 2D barcode is broadened, and a generated 2D barcode includes an information access address, so that security of private information is ensured.

Various embodiments of the present disclosure further provide a computer readable storage medium. The computer readable storage medium may be a computer readable storage medium included in the memory in the other various embodiments, or may also be a computer readable storage medium that exists separately and is not installed in the terminal. The computer readable storage medium stores one or more programs, the one or more programs are used by one or more processors to execute one method for generating a 2D barcode, the method includes the following:

acquiring private information input by a user, and sending the private information to a server through a network, so that the server stores the private information, and generates an information access address corresponding to the private information;

receiving the information access address returned, through the network, by the server; and generating a 2D barcode including the information access address.

Assuming that the above is a first possible implementation manner, in a second possible implementation manner provided on the basis of the first possible implementation manner, the memory of the terminal further includes an instruction for executing the following operation:

the receiving the information access address returned, through the network, by the server includes receiving the information access address that is returned by the server through the network and at least includes an information identifier of the private information.

In another various embodiment provided on the prior various embodiments, the memory of the terminal further includes an instruction for executing the following operation:

receiving an information access address returned, through the network, by the server includes receiving the information access address that is returned by the server through the network and at least includes an information identifier of the private information and a check identifier and/or a time identifier corresponding to the private information.

In the computer readable storage medium provided in the various embodiments, private information input by a user is sent to a server through a network, an information access address returned by the server through the network is received, and a 2D barcode including the information access address is generated. Therefore, generation of a 2D barcode is implemented without encrypting, a cost of generating a 2D barcode is reduced, an application scope of a 2D barcode is broadened, and a generated 2D barcode includes an information access address, so that security of private information is ensured.

Various embodiments of the present disclosure provide a graphical user interface, and the graphical user interface is used on a terminal. The terminal includes a touch screen display, a memory, and one or more processors configured to execute one or more programs. The graphical user interface includes the following:

acquiring private information input by a user, and sending the private information to a server through a network, so that the server stores the private information, and generates an information access address corresponding to the private information;

receiving the information access address returned, through the network, by the server; and generating a 2D barcode including the information access address.

In the graphical user interface provided in the various embodiments of the present disclosure, private information input by a user is sent to a server through a network, an information access address returned by the server through the network is received, and a 2D barcode including the information access address is generated. Therefore, generation of a 2D barcode is implemented without encrypting, a cost of generating a 2D barcode is reduced, an application scope of a 2D barcode is broadened, and a generated 2D barcode includes an information access address, so that security of private information is ensured.

Figure 17:
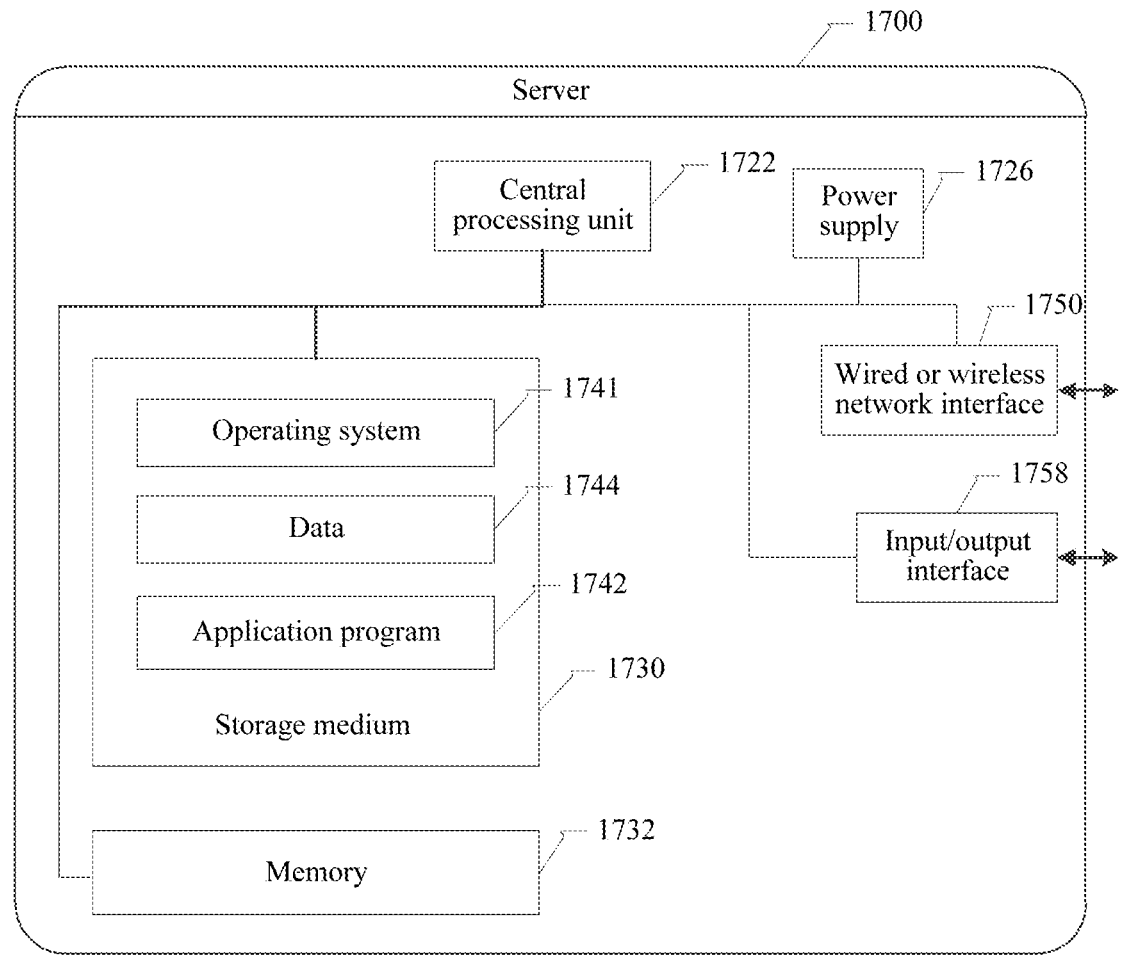
FIG. 17 is a block diagram of a server according to various embodiments of the present disclosure.

FIG. 17 is a block diagram of a server according to various embodiments. The server 1700 may have big differences due to different configurations or performance, and may include one or more central processing units (CPU) 1722 (for example, one or more processors), a memory 1732, and one or more storage media 1730 (for example, one or more massive storage devices) for storing application programs 1742 or data 1744. The memory 1732 and the storage medium 1730 may be stored temporarily or stored permanently. The program stored in the storage medium 1730 may include one or more modules (not shown), and each module may include operations on a series of instructions in the server 1700, including the following:

receiving private information sent, through a network, by a terminal, and storing the private information;

generating an information access address corresponding to the private information; and returning the information access address to the terminal through the network, so that the terminal generates a 2D barcode according to the information access address.

According to various embodiments, the following instructions may be further included:

the generating an information access address corresponding to the private information includes:

acquiring an information identifier of the private information, and storing the information identifier, one information identifier corresponding to one piece of private information; and generating the information access address including the information identifier of the private information.

According to various embodiments, the following instructions may be further included:

during the acquiring an information identifier of the private information, further including:

acquiring a check identifier and/or a time identifier corresponding to the private information, and storing the check identifier corresponding to the private information; and the generating the information access address including the information identifier of the private information includes:

generating the information access address including an information identifier of the private information and the check identifier and/or the time identifier corresponding to the private information.

Further, the central processing unit 1722 may be set to communicate with the storage medium 1730, and operations of a series of instructions in the storage medium 1730 are executed on the server 1700. The server 1700 may further include one or more power supplies 1726, one or more wired or wireless network interfaces 1750, one or more input/output interfaces 1758, and/or, one or more operating systems 1741, for example, Windows Server™, Mac OS X™, Unix™, Linux™, and FreeBSD™.

In the server provided in the various embodiments of the present disclosure, private information sent by a terminal through a network is received and stored, an information access address corresponding to the private information is generated and returned to the terminal through the network, so that the terminal generates a 2D barcode according to the information access address. Therefore, generation of a 2D barcode is implemented without encrypting, a cost of generating a 2D barcode is reduced, an application scope of a 2D barcode is broadened, and a generated 2D barcode includes an information access address, so that security of private information is ensured.

When the terminal for generating a 2D barcode and the server provided in the foregoing various embodiments generate a 2D barcode, the foregoing division of functional modules is used as an example for description. In practical applications, the foregoing functions may be allocated to be accomplished by different functional modules according to needs, that is, the internal structures of the terminal and the server are divided into different functional modules to accomplish all or some of the functions described above. In addition, the terminal for generating a 2D barcode and the server provided in the foregoing various embodiments share the same concept with the various other embodiments of the method for generating a 2D barcode, and reference may be made to the method embodiments for the implementation processes of the terminal and the server, which are no longer elaborated herein.

Figure 18:
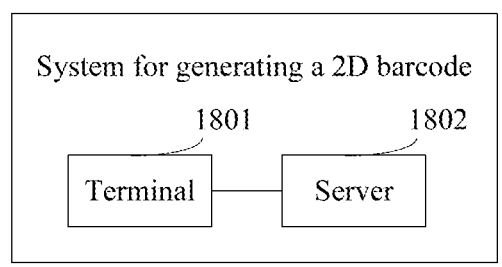
FIG. 18 is a block diagram of a system for generating a 2D barcode according to various embodiments of the present disclosure.

Referring to FIG. 18, various embodiments of the present disclosure provide a system for generating a 2D barcode, and the system includes: a terminal 1801 and a server 1802. The terminal 1801 is configured to acquire private information input by a user, and send the private information to the server 1802 through a network, so that the server 1802 stores the private information and generates an information access address corresponding to the private information. The terminal 1801 is further configured to receive the information access address returned by the server 1802 through the network. The terminal 1801 is further configured to generate a 2D barcode including the information access address. In various embodiments, the terminal 1801 is configured to receive the information access address that is returned by the server 1802 through the network and at least includes an information identifier of the private information. In various embodiments, the terminal 1801 is configured to receive the information access address that is returned by the server 1802 through the network and at least includes an information identifier of the private information and a check identifier and/or a time identifier corresponding to the private information. There may be one or more terminals 1801 and servers 1802, and reference may be made to various embodiments for the structures of the terminal 1801 and the server 1802, which are not limited in the various embodiments.

In the system provided in the various embodiments of the present disclosure, private information input by a user is sent to a server through a network, an information access address returned by the server through the network is received, and a 2D barcode including the information access address is generated. Therefore, generation of a 2D barcode is implemented without encrypting and decrypting, a cost of generating a 2D barcode is reduced, an application scope of a 2D barcode is broadened, and a generated 2D barcode includes an information access address, so that security of private information is ensured.

Figure 19:
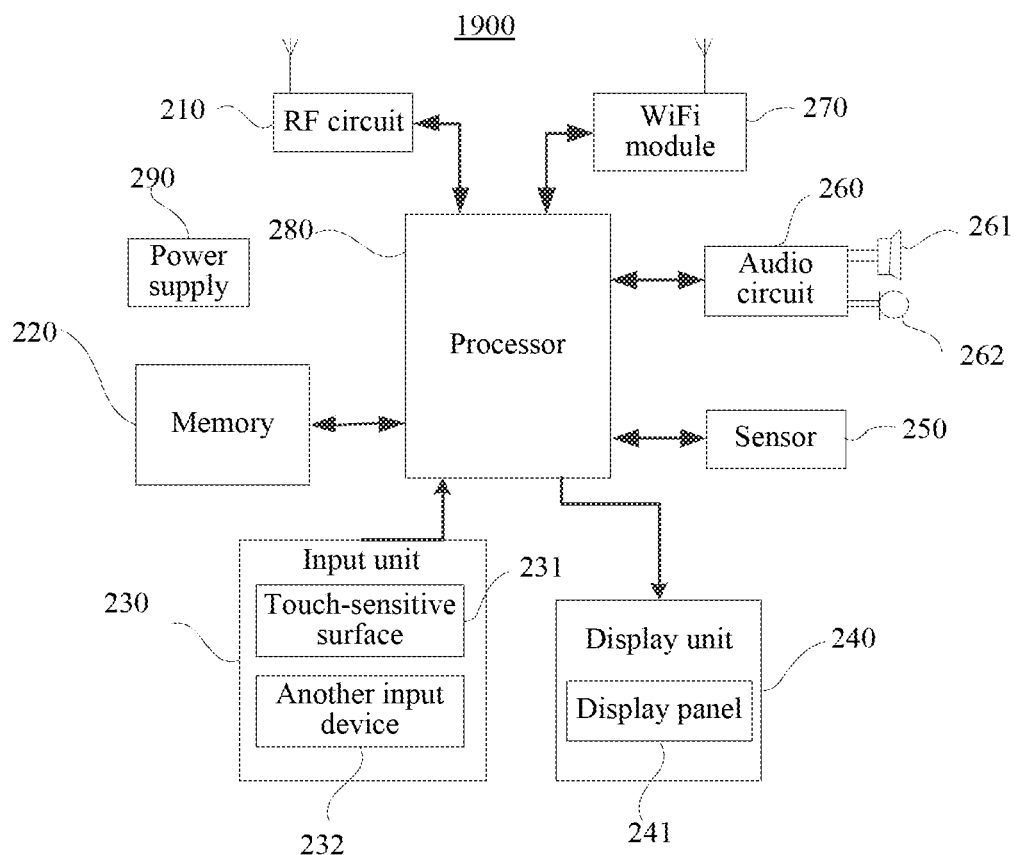
FIG. 19 is a block diagram of a terminal according to various embodiments of the present disclosure.

Various embodiments of the present disclosure provide a terminal. FIG. 19, is a block diagram of a terminal involved in the various embodiments of the present disclosure. The terminal may be configured to implement the method for reading a 2D barcode provided in the foregoing various embodiments. The terminal 1900 may include components such as a Radio Frequency (RF) circuit 210, a memory 220 including one or more computer readable storage media, an input unit 230, a display unit 240, a sensor 250, an audio circuit 260, a Wireless Fidelity (WiFi) module 270, a processor 280 including one or more processing cores, and a power supply 290. A person skilled in the art may understand that the structure of the terminal shown in FIG. 19 does not constitute a limitation to the terminal, and the terminal may include more components or fewer components than those shown in the figure, or some components may be combined, or a different component deployment may be used.

The RF circuit 210 may be configured to receive and send signals during an information receiving and sending process or a call process. Particularly, downlink information from a base station is received and then delivered to one or more processors 280 for processing. In addition, related uplink data is sent to the base station. The RF circuit 210 includes, but is not limited to, an antenna, at least one amplifier, a tuner, one or more oscillators, a subscriber identity module (SIM) card, a transceiver, a coupler, a low noise amplifier (LNA), and a duplexer. In addition, the RF circuit 210 may also communicate with a network and another device by wireless communication. The wireless communication may use any communications standard or protocol, which includes, but is not limited to, Global System for Mobile communications (GSM), General Packet Radio Service (GPRS), Code Division Multiple Access (CDMA), Wideband Code Division Multiple Access (WCDMA), Long Term Evolution (LTE), e-mail, Short Messaging Service (SMS), and the like.

The memory 220 may be configured to store a software program and module. The processor 280 runs the software program and module stored in the memory 220, to implement various functional applications and data processing. The memory 220 may mainly include a program storage area and a data storage area. The program storage area may store an operating system, an application program necessary for at least one function (such as a sound playback function and an image display function), and the like. The data storage area may store data (such as audio data and an address book) created according to use of the terminal 1900, and the like. In addition, the memory 220 may include a high speed random access memory, and may also include a non-volatile memory, such as at least one magnetic disk storage device, a flash memory, or another volatile solid-state storage device. Accordingly, the memory 220 may further include a memory controller, so that the processor 280 and the input unit 230 access the memory 220.

The input unit 230 may be configured to receive input digit or character information, and generate a keyboard, mouse, joystick, optical, or track ball signal input related to the user setting and function control. The input unit 230 may include a touch-sensitive surface 231 and another input device 232. The touch-sensitive surface 231, which may also be referred to as a touch screen or a touch panel, may collect a touch operation of a user on or near the touch-sensitive surface (such as an operation of a user on or near the touch-sensitive surface 231 by using any suitable object or accessory, such as a finger or a stylus), and drive a corresponding connection apparatus according to a preset program. Optionally, the touch-sensitive surface 231 may include two parts, including a touch detection apparatus and a touch controller. The touch detection apparatus detects a touch position of the user, detects a signal generated by the touch operation, and transfers the signal to the touch controller. The touch controller receives the touch signal from the touch detection apparatus, converts the touch signal into touch point coordinates, and sends the touch point coordinates to the processor 280. Moreover, the touch controller can receive and execute a command sent from the processor 280. In addition, the touch-sensitive surface 231 may be may be a resistive, capacitive, infrared, or surface sound wave type touch-sensitive surface. In addition to the touch-sensitive surface 231, the input unit 230 may further include the another input device 232. The another input device 232 may include, but is not limited to, one or more of a physical keyboard, a functional key (such as a volume control key or a switch key), a track ball, a mouse, and a joystick.

The display unit 240 may be configured to display information input by the user or information provided for the user, and various graphical user interfaces of the terminal 1900. The graphical user interfaces may be formed by a graph, a text, an icon, a video, and any combination thereof. The display unit 240 may include a display panel 241. Optionally, the display panel 241 may be configured by using a liquid crystal display (LCD), an organic light-emitting diode (OLED), or the like. Further, the touch-sensitive surface 231 may cover the display panel 241. After detecting a touch operation on or near the touch-sensitive surface 231, the touch-sensitive surface 231 transfers the touch operation to the processor 280, so as to determine the type of the touch event. The processor 280 then provides a corresponding visual output on the display panel 241 according to the type of the touch event. Although, in FIG. 19, the touch-sensitive surface 231 and the display panel 241 are used as two separate parts to implement input and output functions, in various embodiments, the touch-sensitive surface 231 and the display panel 241 may be integrated to implement the input and output functions.

The terminal 1900 may further include at least one sensor 250, such as an optical sensor, a motion sensor, and other sensors. The optical sensor may include an ambient light sensor and a proximity sensor. The ambient light sensor may adjust luminance of the display panel 241 according to brightness of the ambient light. The proximity sensor may switch off the display panel 241 and/or backlight when the terminal 1900 is moved to the ear. As one type of motion sensor, a gravity acceleration sensor may detect magnitude of accelerations in various directions (generally on three axes), may detect magnitude and a direction of the gravity when static, and may be applied to an application that recognizes the attitude of the mobile phone (for example, switching between landscape orientation and portrait orientation, a related game, and magnetometer attitude calibration), a function related to vibration recognition (such as a pedometer and a knock), and the like. Other sensors, such as a gyroscope, a barometer, a hygrometer, a thermometer, and an infrared sensor, which may be configured in the terminal 1900, are not further described herein.

The audio circuit 260, a loudspeaker 261, and a microphone 262 may provide audio interfaces between the user and the terminal 1900. The audio circuit 260 may convert received audio data into an electric signal and transmit the electric signal to the loudspeaker 261. The loudspeaker 261 converts the electric signal into a sound signal for output. On the other hand, the microphone 262 converts a collected sound signal into an electric signal. The audio circuit 260 receives the electric signal and converts the electric signal into audio data, and outputs the audio data to the processor 280 for processing. Then, the processor 280 sends the audio data to, for example, another terminal by using the RF circuit 210, or outputs the audio data to the memory 220 for further processing. The audio circuit 260 may further include an earplug jack, so as to provide communication between a peripheral earphone and the terminal 1900.

Wi-Fi is a short distance wireless transmission technology. The terminal 1900 may help, by using the Wi-Fi module 270, the user to receive and send e-mails, browse a webpage, access stream media, and so on, which provides wireless broadband Internet access for the user. Although FIG. 19 shows the Wi-Fi module 270, it may be understood that the wireless communications unit is not a necessary component of the terminal 1900, and when necessary, the wireless communications unit may be omitted as long as the scope of the essence of the present disclosure is not changed.

The processor 280 is the control center of the terminal 1900, and is connected to various parts of the mobile phone by using various interfaces and lines. By running or executing the software program and/or module stored in the memory 220, and invoking data stored in the memory 220, the processor 280 performs various functions and data processing of the terminal 1900, thereby performing overall monitoring on the mobile phone. Optionally, the processor 280 may include one or more processing cores. The processor 280 may integrate an application processor and a modem. The application processor mainly processes an operating system, a user interface, an application program, and the like. The modem mainly processes wireless communication. The foregoing modem may also not be integrated into the processor 280.

The terminal 1900 further includes the power supply 290 (such as a battery) for supplying power to the components. The power supply may be logically connected to the processor 280 by using a power management system, thereby implementing functions such as charging, discharging and power consumption management by using the power management system. The power supply 290 may further include any component, such as one or more direct current or alternate current power supplies, a re-charging system, a power supply fault detection circuit, a power supply converter or an inverter, and a power supply state indicator.

Although not shown in the figure, the terminal 1900 may further include a camera, a Bluetooth module, and the like, which are not further described herein. According to various embodiments, the display unit of the terminal is a touch screen display, and the terminal further includes a memory and one or more programs. The one or more programs are stored in the memory and configured to be executed by one or more processors. The one or more programs contain instructions for executing the following operations:

acquiring a 2D barcode including an information access address, and scanning the 2D barcode, to obtain the information access address included in the 2D barcode, the information access address being for accessing private information;

sending the information access address to a server through a network, so that the server searches for corresponding private information according to the information access address; and receiving the private information returned, through the network, by the server, and using the private information as a reading result of the 2D barcode.

Assuming that the above is one various embodiment, in a second possible implementation manner provided on the basis of the one various embodiment, the memory of the terminal further includes instructions for executing the following operations:

the information access address at least includes an information identifier of the private information; and the receiving the private information returned, through the network, by the server includes:

receiving, after the server finds the private information according to the information identifier of the private information included in the information access address, the private information returned through the network.

In a third possible implementation manner provided on the basis of the first possible implementation manner, the memory of the terminal further includes instructions for executing the following operations:

the information access address further includes a check identifier and/or a time identifier corresponding to the private information; and the receiving the private information returned, through the network, by the server includes:

receiving, after the server finds the private information according to an information identifier of the private information and the check identifier and/or the time identifier corresponding to the private information included in the information access address, the private information returned through the network.

In the terminal provided in the various embodiments of the present disclosure, a 2D barcode including an information access address is acquired and scanned to obtain the information access address included in the 2D barcode, the information access address is sent to a server through a network, and the private information returned by the server through the network is then received; therefore, reading of a 2D barcode is implemented without decrypting, a cost of reading a 2D barcode is reduced, an application scope of a 2D barcode is broadened, and a read 2D barcode includes an information access address, so that security of private information is ensured.

Various embodiments of the present disclosure further provide a computer readable storage medium. The computer readable storage medium may be a computer readable storage medium included in the memory in the above various embodiments, or may also be a computer readable storage medium that exists separately and is not installed in the terminal. The computer readable storage medium stores one or more programs, the one or more programs are used by one or more processors to execute one method for reading a 2D barcode, the method including:

acquiring a 2D barcode including an information access address, and scanning the 2D barcode, to obtain the information access address included in the 2D barcode, the information access address being for accessing private information;

sending the information access address to a server through a network, so that the server searches for corresponding private information according to the information access address; and receiving the private information returned, through the network, by the server, and using the private information as a reading result of the 2D barcode.

Assuming that the above is a first possible implementation manner, in a second possible implementation manner provided on the basis of the first possible implementation manner, the memory of the terminal further includes instructions for executing the following operations:

the information access address at least includes an information identifier of the private information; and the receiving the private information returned, through the network, by the server includes:

receiving, after the server finds the private information according to the information identifier of the private information included in the information access address, the private information returned through the network.

In a third possible implementation manner provided on the basis of the first possible implementation manner, the memory of the terminal further includes instructions for executing the following operations:

the information access address further includes a check identifier and/or a time identifier corresponding to the private information; and the receiving the private information returned, through the network, by the server includes:

receiving, after the server finds the private information according to an information identifier of the private information and the check identifier and/or the time identifier corresponding to the private information included in the information access address, the private information returned through the network.

In the computer readable storage medium provided in the various embodiments of the present disclosure, a 2D barcode including an information access address is acquired and scanned to obtain the information access address included in the 2D barcode, the information access address is sent to a server through a network, and the private information returned by the server through the network is then received; therefore, reading of a 2D barcode is implemented without decrypting, a cost of reading a 2D barcode is reduced, an application scope of a 2D barcode is broadened, and a read 2D barcode includes an information access address, so that security of private information is ensured.

Various embodiments of the present disclosure provide a graphical user interface, and the graphical user interface is used on a terminal. The terminal includes a touchscreen display, a memory, and one or more processors configured to execute one or more programs. The graphical user interface includes the following:

acquiring a 2D barcode including an information access address, and scanning the 2D barcode, to obtain the information access address included in the 2D barcode, the information access address being for accessing private information;

sending the information access address to a server through a network, so that the server searches for corresponding private information according to the information access address; and receiving the private information returned, through the network, by the server, and using the private information as a reading result of the 2D barcode.

In the graphical user interface provided in the various embodiments of the present disclosure, a 2D barcode including an information access address is acquired and scanned to obtain the information access address included in the 2D barcode, the information access address is sent to a server through a network, and the private information returned by the server through the network is then received. Therefore, reading of a 2D barcode is implemented without decrypting, a cost of reading a 2D barcode is reduced, an application scope of a 2D barcode is broadened, and a read 2D barcode includes an information access address, so that security of private information is ensured.

Figure 20:
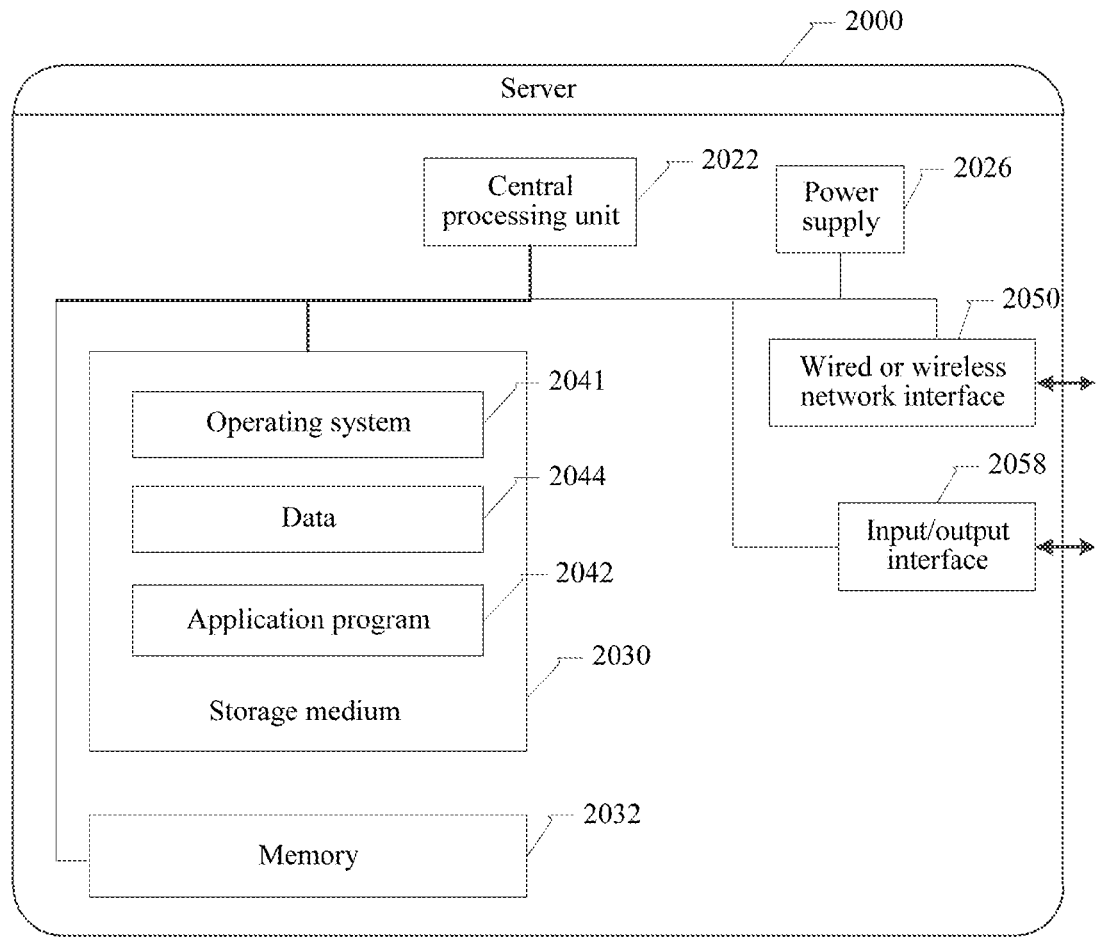
FIG. 20 is a block diagram of a server according to various embodiments of the present disclosure.

FIG. 20 is a block diagram of a server provided in various embodiments of the present disclosure. The server 2000 may have big differences due to different configurations or performance, and may include one or more central processing units (CPU) 2022 (for example, one or more processors), a memory 2032, and one or more storage media 2030 (for example, one or more massive storage devices) for storing application programs 2042 or data 2044. The memory 2032 and the storage medium 2030 may be stored temporarily or stored permanently. The program stored in the storage medium 2030 may include one or more modules (not shown), and each module may include operations on a series of instructions in the server 2000 as follow:

receiving an information access address sent, through a network, by a terminal and for accessing private information;

searching prestored private information for private information corresponding to the information access address; and returning the found private information to the terminal through the network, so that the terminal uses the private information as a reading result of a 2D barcode.

In various embodiments, the following instructions may be further included.

The information access address includes an information identifier of the private information; and the searching prestored private information for private information corresponding to the information access address includes:

searching the prestored private information for the private information corresponding to the information identifier included in the information access address.

In various embodiments, the following instructions may be further included:

the information access address further includes a check identifier and/or a time identifier; and the searching the prestored private information for the private information corresponding to the information identifier included in the information access address includes:

determining whether the check identifier included in the information access address is consistent with a prestored check identifier, and/or determining whether the time identifier included in the information access address is ineffective; and executing, if the check identifier included in the information access address is consistent with the prestored check identifier, and/or the time identifier included in the information access address is not ineffective, the block of searching the prestored private information for the private information corresponding to the information identifier included in the information access address.

Further, the central processing unit 2022 may be set to communicate with the storage medium 2030, and operations of a series of instructions in the storage medium 2030 are executed on the server 2000.

The server 2000 may further include one or more power supplies 2026, one or more wired or wireless network interfaces, 2050, one or more input/output interfaces 2058, and/or, one or more operating systems 2041, for example, Windows Server™, Mac OS X™, Unix™, Linux™, and FreeBSD™.

In the server provided in the various embodiments of the present disclosure, an information access address sent by a terminal through a network is received, and private information corresponding to the information access address found from prestored private information is returned to the terminal through the network, so that the terminal uses the private information as a reading result of a 2D barcode. Therefore, reading of a 2D barcode is implemented without decrypting, a cost of reading a 2D barcode is reduced, an application scope of a 2D barcode is broadened, and a read 2D barcode includes an information access address, so that security of private information is ensured.

When the terminal for reading a 2D barcode and the server provided in the foregoing various embodiments read a 2D barcode, the foregoing division of functional modules is used as an example for description. In practical applications, the foregoing functions may be allocated to be accomplished by different functional modules according to needs, that is, the internal structures of the terminal and the server are divided into different functional modules to accomplish all or some of the functions described above. In addition, the terminal for generating a 2D barcode and the server provided in the foregoing various embodiments share the same concept with the various embodiments of the method for reading a 2D barcode, and reference may be made to the method embodiments for the implementation processes of the terminal and the server, which are no longer elaborated herein.

Figure 21:
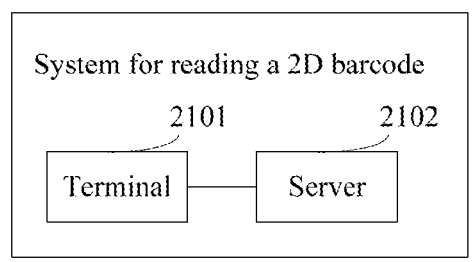
FIG. 21 is a block diagram of a system for reading a 2D barcode according to various embodiments of the present disclosure.

Referring to FIG. 21, various embodiments of the present disclosure provide a system for reading a 2D barcode. The system includes a terminal 2101 and a server 2102. The terminal 2101 is configured to acquire a 2D barcode including an information access address, and scan the 2D barcode, to obtain the information access address included in the 2D barcode, the information access address being for accessing private information. The terminal 2101 is further configured to send the information access address to the server 2102 through a network, so that the server 2102 searches for corresponding private information according to the information access address. The terminal 2101 is further configured to receive the private information returned through the network by the server 2102, and use the private information as a reading result of the 2D barcode. In various embodiments, the information access address obtained through scanning by the terminal 2101 at least includes an information identifier of the private information.

The terminal 2101 is configured to receive, after the server 2102 finds the private information according to the information identifier of the private information included in the information access address, the private information returned through the network. In various embodiments, the information access address obtained through scanning by the terminal 2101 further includes a check identifier and/or a time identifier corresponding to the private information. The terminal 2101 is configured to receive, after the server 2102 finds the private information according to an information identifier of the private information and the check identifier and/or the time identifier corresponding to the private information included in the information access address, the private information returned through the network.

There may be one or more terminals 1801 and servers 1802, and reference may be made to various embodiments for the structures of the terminal 1801 and the server 1802, which are not limited in the various embodiments.

In the system provided in the various embodiments of the present disclosure, a 2D barcode including an information access address is acquired and scanned to obtain the information access address included in the 2D barcode, the information access address is sent to a server through a network, and the private information returned by the server through the network is then received; therefore, reading of a 2D barcode is implemented without decrypting, a cost of reading a 2D barcode is reduced, an application scope of a 2D barcode is broadened, and a read 2D barcode includes an information access address, so that security of private information is ensured.

A person of ordinary skill in the art may understand that all or some of the blocks of the various embodiments may be implemented by using hardware, or may be implemented by a program instructing relevant hardware. The program may be stored in a computer readable storage medium. The storage medium may be a read-only memory, a magnetic disk, an optical disc, or the like.

The foregoing descriptions are various embodiments of the present disclosure, but are not intended to limit the present disclosure. Any modification, equivalent replacement, or improvement made within the spirit and principle of the present disclosure shall fall within the protection scope of the present disclosure.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more blocks within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks and flowchart elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language) or XML (extensible markup language), (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Swift, Haskell, Go, SQL, R, Lisp, Java®, Fortran, Perl, Pascal, Curl, OCaml, Javascript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

None of the elements recited in the claims are intended to be a means-plus-function element within the meaning of 35 U.S.C. §112(f) unless an element is expressly recited using the phrase "means for," or in the case of a method claim using the phrases "operation for" or "step for."

What is claimed is:

1. A method for generating a 2D barcode, wherein the method comprises:
   receiving private information sent, through a network, by a terminal, and storing the private information;
   generating an information access address corresponding to the private information; and
   returning the information access address to the terminal through the network, so that the terminal generates a 2D barcode according to the information access address;
   wherein the generating an information access address corresponding to the private information comprises:
   acquiring an information identifier of the private information, and storing the information identifier, one information identifier corresponding to one piece of private information; and
   generating the information access address comprising the information identifier of the private information.

2. The method according to claim 1, wherein the generated information access address is a Uniform Resource Locator (URL) corresponding to the private information.

3. The method according to claim 1, wherein the acquiring the information identifier of the private information comprises:
   calculating a Message Digest Algorithm 5 (MD5) value according to the private information, wherein the MD5 value is a 64-bit 8-byte integral type, and taking the MD5 value as the information identifier of the private information.

4. The method according to claim 1, during the acquiring an information identifier of the private information, further comprising:
   acquiring a check identifier and/or a time identifier corresponding to the private information, and storing the check identifier corresponding to the private information;
   the generating the information access address comprising the information identifier of the private information comprises:
   generating the information access address comprising the information identifier of the private information and the check identifier and/or the time identifier corresponding to the private information.

5. The method according to claim 4, wherein the acquiring the check identifier corresponding to the private information comprises:
   randomly generating a 64-bit 8 byte integral type value, and taking the randomly generated value as the check identifier corresponding to the private information, the check identifier is for checking the validity of the information access address;
   the acquiring the time identifier corresponding to the private information comprises:
   generating a 64-bit 8-byte integral type timestamp according to server time, and taking the timestamp as the time identifier corresponding to the private information, wherein the timestamp is for checking effectiveness of the information access address.

6. A method for reading a 2D barcode, wherein the method comprises:
   acquiring a 2D barcode comprising an information access address, and scanning the 2D barcode, to obtain the information access address comprised in the 2D barcode, the information access address being for accessing private information;
   sending the information access address to a server through a network, so that the server searches for corresponding private information according to the information access address; and
   receiving the private information returned, through the network, by the server, and using the private information as a reading result of the 2D barcode;
   wherein the information access address at least comprises an information identifier of the private information; and
   the receiving the private information returned, through the network, by the server comprises:
   receiving, after the server finds the private information according to the information identifier of the private information comprised in the information access address, the private information returned through the network.

7. The method according to claim 6, wherein the information access address is a Uniform Resource Locator (URL) of a network Hyper Text Transfer Protocol (HTTP)/Hypertext Transfer Protocol over Secure Socket Layer (HTTPS) request.

8. The method according to claim 6, wherein the information access address further comprises a check identifier and/or a time identifier corresponding to the private information; and
   the receiving the private information returned, through the network, by the server comprises:
   receiving, after the server finds the private information according to an information identifier of the private information and the check identifier and/or the time identifier corresponding to the private information comprised in the information access address, the private information returned through the network.

9. The method according to claim 8, wherein the information access address comprises the information identifier of the private information and the check identifier corresponding to the private information, the private information returned by the server is determined by:
   determining whether the check identifier included in the information access address is consistent with a prestored check identifier, if the check identifier included in the information access address is consistent with the prestored check identifier, searching prestored private information for the private information corresponding to the information identifier included in the information access address.

10. The method of claim 8, wherein the information access address comprises the information identifier of the private information and the time identifier corresponding to the private information, the private information returned by the server is determined by:

determining whether the time identifier in the information access address is ineffective, if the time identifier included in the information access address is not ineffective, searching prestored private information for the private information corresponding to the information identifier included in the information access address.

11. The method according to claim 8, wherein the information access address comprises the information identifier of the private information, the check identifier corresponding to the private information and the time identifier corresponding to the private information, the private information returned by the server is determined by:
determining whether the check identifier included in the information access address is consistent with a prestored check identifier, if the check identifier included in the information access address is consistent with the prestored check identifier, determining whether the time identifier included in the information access address is ineffective, if the time identifier included in the information access address is not ineffective, searching prestored private information for the private information corresponding to the information identifier included in the information access address.

12. A method for reading a 2D barcode, wherein the method comprises:
receiving an information access address sent, through a network, by a terminal and for accessing private information;
searching prestored private information for private information corresponding to the information access address; and
returning the found private information to the terminal through the network, so that the terminal uses the private information as a reading result of a 2D barcode;
wherein the information access address comprises an information identifier of the private information; and
the searching prestored private information for private information corresponding to the information access address comprises:
searching the prestored private information for the private information corresponding to the information identifier comprised in the information access address.

13. The method according to claim 12, wherein the information access address is a Uniform Resource Locator (URL) of a network Hyper Text Transfer Protocol (HTTP)/Hypertext Transfer Protocol over Secure Socket Layer (HTTPS) request.

14. The method according to claim 12, wherein the information access address further comprises a check identifier;
the searching the prestored private information for the private information corresponding to the information identifier comprised in the information access address comprises:
determining whether the check identifier comprised in the information access address is consistent with a prestored check identifier;
executing, if the check identifier comprised in the information access address is consistent with the prestored check identifier, the process of searching the prestored private information for the private information corresponding to the information identifier comprised in the information access address.

15. The method according to claim 12, wherein the information access address further comprises a time identifier;
the searching the prestored private information for the private information corresponding to the information identifier comprised in the information access address comprises:
determining whether the time identifier comprised in the information access address is ineffective;
executing, if the time identifier comprised in the information access address is not ineffective, the process of searching the prestored private information for the private information corresponding to the information identifier comprised in the information access address.

16. The method according to claim 12, wherein the information access address further comprises a check identifier and a time identifier;
the searching the prestored private information for the private information corresponding to the information identifier comprised in the information access address comprises:
executing, if the check identifier comprised in the information access address is consistent with the prestored check identifier, and/or the time identifier comprised in the information access address is not ineffective, the process of searching the prestored private information for the private information corresponding to the information identifier comprised in the information access address.

* * * * *